United States Patent [19]
Baum et al.

[11] Patent Number: 5,655,146
[45] Date of Patent: Aug. 5, 1997

[54] COEXECUTION PROCESSOR ISOLATION USING AN ISOLATION PROCESS OR HAVING AUTHORITY CONTROLS FOR ACCESSING SYSTEM MAIN STORAGE

[75] Inventors: Richard Irwin Baum, Poughkeepsie; Glen Alan Brent, Red Hook, both of N.Y.; Hatem Mohamed Ghafir, Olney, Md.; Balakrishna Raghavendra Iyer, San Jose; Inderpal Singh Narang, Saratoga, both of Calif.; Gururaj Seshagiri Rao, Cortlandt Maner; Casper Anthony Scalzi, Poughkeepsie, both of N.Y.; Satya Prakash Sharma, Round Rock, Tex.; Bhaskar Sinha, Poughkeepsie; Lee Hardy Wilson, Red Hook, both of N.Y.

[73] Assignee: International Business Machines Corporation, Armonk, N.Y.

[21] Appl. No.: 680,069

[22] Filed: Jul. 12, 1996

Related U.S. Application Data

[63] Continuation of Ser. No. 474,925, Jun. 7, 1995, abandoned, which is a continuation of Ser. No. 199,041, Feb. 18, 1994, abandoned.

[51] Int. Cl.$^6$ .................................................. G06F 13/12
[52] U.S. Cl. ................................. 395/825; 395/848
[58] Field of Search ............................ 395/200.05, 825, 395/827, 840, 800, 848, 477, 479

[56] References Cited

U.S. PATENT DOCUMENTS

| | | | |
|---|---|---|---|
| 3,573,741 | 4/1971 | Gavril ........................... | 395/275 |
| 3,576,544 | 4/1971 | Cordero et al. ................ | 395/425 |
| 3,713,107 | 1/1973 | Barsamian ..................... | 395/800 |
| 3,725,864 | 4/1973 | Clark et al. .................... | 395/275 |
| 3,839,706 | 10/1974 | Borchsenius ................. | 395/400 |
| 4,042,914 | 8/1977 | Curley et al. .................. | 395/375 |
| 4,071,890 | 1/1978 | Pandeya ........................ | 395/800 |
| 4,310,879 | 1/1982 | Pandeya ........................ | 395/425 |
| 4,547,849 | 10/1985 | Louie et al. . | |
| 4,787,026 | 11/1988 | Barnes et al. ................. | 395/700 |
| 4,894,768 | 1/1990 | Iwasaki et al. . | |
| 4,914,578 | 4/1990 | MacGregor et al. . | |
| 4,926,318 | 5/1990 | Nakayama . | |
| 4,942,519 | 7/1990 | Kakayama . | |
| 4,943,915 | 7/1990 | Wilhelm et al. . | |
| 5,146,575 | 9/1992 | Nolan, Jr. . | |
| 5,210,870 | 5/1993 | Baum et al. ................... | 395/600 |
| 5,237,668 | 8/1993 | Blandy et al. ................. | 395/400 |

*Primary Examiner*—Richard L. Ellis
*Attorney, Agent, or Firm*—Bernard M. Goldman

[57] ABSTRACT

A coexecutor for executing functions offloaded from central processors (CPs) in a data processing system, as requested by one or more executing control programs, which include a host operating system (host OS), and subsystem programs and applications executing under the host OS. The offloaded functions are embodied in code modules. Code modules execute in the coexecutor in parallel with non-offloaded functions being executed by the CPs. Thus, the CPs do not need to execute functions which can be executed by the coexecutor. CP requests to the coexecutor specify the code modules which are accessed by the coexecutor from host shared storage under the same constraints and access limitations as the control programs. The coexecutor may emulate host dynamic address translation, and may use a provided host storage key in accessing host storage. The restricted access operating state for the coexecutor maintains data integrity. Coexecutors can be of the same architecture or of a totally different architecture from the CPs to provide an efficient processing environment for the offloaded functions. The coexecutor interfaces host software which provides the requests to the coexecutor. Offloaded modules, once accessed by the coexecutor, may be cached in coexecutor local storage for use by future requests to allow subsequent invocations to proceed without waiting to again load the same module.

12 Claims, 19 Drawing Sheets

| NUMBER OF VIRTUAL SPACES (N) |
| --- |
| VIRTUAL SPACE #1 ALET |
| ⋮ |
| VIRTUAL SPACE #N ALET |
| PARMETER LIST ALET |
| PARMETER LIST VIRTUAL ADDRESS |
| PARMETER LIST LENGTH |
| MODULE ALET |
| MODULE VIRTUAL ADDRESS |
| MODULE LENGTH |
| MODULE TOKEN |
| CONTROL TABLE LIST ALET |
| CONTROL TABLE LIST VIRTUAL ADDRESS |
| NUMBER OF CONTROL TABLES (M) |

FIG. 2

| | VIRT. SPACE # | VIRTUAL ADDRESS | LENGTH |
|---|---|---|---|
| INPUT OUTPUT | | | |
| FEEDBACK | | | |

FIG. 3

| | TOKEN | VIRT. SPACE # | VIRTUAL ADDRESS | LENGTH |
|---|---|---|---|---|
| CTL TABLE 1 | | | | |
| CTL TABLE 2 | | | | |
| ⋮ | ⋮ | ⋮ | ⋮ | ⋮ |
| CTL TABLE N | | | | |

FIG. 4

| PROGRAMMING PARAMETER | |
|---|---|
| LENGTH | COMMAND |
| CSB OFFSET | STORAGE KEYS |
| | |
| | |

FIG. 6

| NUMBER OF VIRTUAL SPACES (N) |
| --- |
| VIRTUAL SPACE #1 STD |
| ⋮ |
| VIRTUAL SPACE #N STD |
| PARMETER LIST STD |
| PARMETER LIST VIRTUAL ADDRESS |
| PARMETER LIST LENGTH |
| MODULE STD |
| MODULE VIRTUAL ADDRESS |
| MODULE LENGTH |
| MODULE TOKEN |
| CONTROL TABLE LIST STD |
| CONTROL TABLE LIST VIRTUAL ADDRESS |
| NUMBER OF CONTROL TABLES (M) |
| INVOKING PROGRAM ID |

FIG. 7

| ERROR CODE |
|---|
| FAILING VIRTUAL SPACE # |
| FAILING VIRTUAL ADDRESS |
| |
| |

FIG. 8

| | LPAR# | FREE | PROGRAM ID | TOKEN | LRU | COEX ADDR | LENGTH |
|---|---|---|---|---|---|---|---|
| 1 | | | | | | | |
| 2 | | | | | | | |
| ⋮ | | | | | | | |
| M | | | | | | | |

FIG. 9

| GET/PUT | VIRTUAL SPACE # | ADDRESS | LENGTH | COEX ADDRESS |

FIGURE 14

COEXECUTION PROCESSOR ISOLATION USING AN ISOLATION PROCESS OR HAVING AUTHORITY CONTROLS FOR ACCESSING SYSTEM MAIN STORAGE

This application is a continuation of application Ser. No. 08/474,925, filed Jun. 7, 1995, now abandoned, which is a continuation of application Ser. No. 08/199,041, filed Feb. 18, 1994, now abandoned, of which Feb. 18, 1994 is claimed as the priority date hereof.

The invention relates providing means and method for using general auxiliary processors to perform parallel processing extensions in an otherwise conventional computing system. Parallel processing determinations are made by progamming applications or subsystems, or by a host program, which offloads work from the main processors, or central processors (CPs), in a Central Electronics Complex (CEC) to the auxiliary processors. These auxiliary processors are herein called coexecutors (COEX). The COEXs are dynamically shared by the programing applications and/or programming subsystems executing on any central processor in the CEC. Operation environment software and hardware interfaces are provided in which programs running on the central processors can provide and invoke code modules to be executed in a coexecutor. These code modules provide functions specific to and required by the application and subsystem programs, but the code modules execute in the COEX environment that provides access to both CEC and coexecutor storages with the same access security that is guaranteed by the CEC's operating system. A coexecutor operates asynchronously to the central processors.

A coexecutor is allowed to cache code modules including programs and control tables in its local storage for subsequent invocations, avoiding the expense of reloading code modules and data into the COEX local storage.

INCORPORATION BY REFERENCE

The specification incorporates by reference into the subject specification the following prior-filed patent applications:

U.S. Pat. No. 5,237,668 issued Aug. 17, 1993 "Processing Using Virtual Addressing in a Non-Privileged Instruction to Control the Copying of a Page in or Between Multiple Media," assigned to the same assignee as the subject application.

U.S. application Ser. No. 07/816,917 filed Jan. 3, 1992, now U.S. Pat. No. 5,442,802, entitled "Asynchronous Co-processor Data Mover Method and Means," assigned to the same assignee as the subject application.

U.S. application Ser. No. 08/012,187 filed Feb. 8, 1993, now U.S. Pat. No. 5,459,864, entitled "Load Balancing, Continuous Availability and Reconfiguration Control for an Asynchronous Data Facility," assigned to the same assignee as the subject application.

U.S. application Ser. No. 08/073,815 filed Jun. 8, 1993, now U.S. Pat. No. 5,377,337, entitled "Method and Means for Enabling Virtual Addressing Control by Software Users Over a Hardware Page Transfer Control Entity," assigned to the same assignee as the subject application.

BACKGROUND

A coexecutor is a separate processing entity within a general-purpose computing system that provides asynchronous, offloaded, processing of compute-intensive functions such as moving data within electronic storage, data sorting, database searching, vector processing, or decompression of compressed data. The advantage of this approach is that the coexecutor can be a different architecture than the CEC general-purpose processor. The architecture and the functional command set of the coexecutor is chosen to provide either better performance for the specific function to be performed, or better price/performance than the CEC processors.

A coexecutor that can execute a single function, copying pages of data between storage levels in an electronic storage hierarchy was described and claimed in prior-cited application Ser. No. 07/816,917, now U.S. Pat. No. 5,442,802. The Asynchronous Data Mover (ADM) Coprocessor claimed in that application provided a coexecutor which could be invoked by an application program to move data asynchronously, using real or virtual addresses. Both Main storage (MS) and Expanded storage (ES) could be addressed using virtual addresses, in the manner described in the prior-cited issued Pat. No. 5,237,668.

U.S. A application Ser. No. 08/012,187, now U.S. Pat. No. 5,459,864, improved the original single engine design to teach how a plurality of coexecutor engines, called coprocessors in that application, could work in concert to provide a highly-reliable coexecuting subsystem that automatically redistributes the workload among the coprocessor engines to efficiently perform the ADM work, and how the ADM can continue to operate even though one or more of its coprocessors has failed.

U.S. application Ser. No. 08/073,815, now U.S. Pat. No. 5,377,337 teaches how the ADM coexecutor, called a coprocessor in that application, can be invoked through an operating system service which provides a software-to-software interface and a software-to-hardware interface. The software-to-software interface provides to user programs that need the use of expanded storage a method of obtaining the use of the ADM functions. The software-to-hardware interface provides the means by which the operating system services discover the existence of the facility, control the initialization and invocation, and process completion and termination information of the facility.

As part of this interface, the hardware implements synchronization of accesses to ES virtual addresses to maintain data integrity between the multiple processes that can be accessing ES simultaneously.

This application teaches a general coexecutor facility providing a coexecutor that allows code modules to be loaded and executed on the coexecutor engine in an environment that enforces in the coexecutor the same operational integrity and data security that exists in the invoking processors.

SUMMARY OF THE INVENTION

The invention provides means and method for using general auxiliary processors to perform parallel processing extensions in a computing system, which may be similar to an S/390 conventional mainframe. Parallel processing determinations may be made by progamming applications, programming subsystems, and/or by a host control program, which communicates determinations to offload work from central processor engines (CPs), which are the main processors in a Central Electronics Complex (CEC), to the auxiliary processors. These auxiliary processors are herein called coexecutors (COEX). The COEX hardware is dynamically shared by the programming applications, programming subsystems, and host operating system (host OS) executing on any central processor in the CEC. This invention provides the COEX as a separate computing entity in a CEC which is comprised of one or more CPs, an Input/Output (I/O) subsystem, and a shared electronic storage. The shared electronic storage has a central electronic storage, called a main storage (MS), and may have a second level electronic storage, called expanded storage (ES).

The COEX may support a single or plural instruction streams, and each COEX instruction stream executes programs written in the COEX computer architecture, which may be different from the computer architecture of the CPs. These COEX plural instruction streams are supported by plural COEX processors which may be built to the same or different computer architectures from each other and from the CPs. The COEX architectures selected are chosen to provide excellent price/performance for the CP functions to be offloaded to the COEX, as compared to the price/performance of executing the functions on a CP. Thus, COEX architecture(s) may be completely different from the CP architecture used by the CP instructions, the CP storage addressing, and the CP I/O in a CEC.

The purpose of a COEX is to offload the CP processing of frequently required compute-intensive functions, and to process the offloaded work in parallel with CP processing in the CEC to improve overall performance of a computer system, and to reduce its processing costs.

A software-to-software interface and a software-to-hardware interface are provided for software users to use the hardware coexecutor (COEX) in a data processing system. The software users of a CEC operate application programs, and the application programs operate under either the host OS or a programing subsystem which operates under the host OS. The lowest level of operating system (i.e. the OS directly over the application program) uses the software-to-software interface to provide a parameter list to the host OS of functions in the application supported by COEX code modules. The host OS then prepares a formal CP request operand specification containing a list of code modules for some or all of the functions in the list received from the subsystem which can be executed by an existing code module. The host OS next selects and primes a CP to execute an instruction that communicates the CP request to the COEX, which is the software-to-hardware interface that issues the CP request to the COEX. The COEX processors execute the listed code module(s) asynchronously to, and in parallel with, operations of the central processors.

The host OS has the option of preparing one or more CP requests for a single function list received for an application program. The host OS may prepare a plurality of CP requests for different functions on the list, and the COEX can dispatch the different CP requests in parallel on different instruction streams in the COEX which may then execute different code modules in parallel, or in an overlapped manner, according to any dependencies indicated among the functions in the received list.

Also, the host OS determines if any of the functions on a received list can not be executed by the COEX. If any function cannot be executed by a COEX, the host OS does not put any code module in any CP request, and has a CP execute that function, e.g. as part of the CP execution for the originally requesting application program.

Each COEX processor has direct hardware access to the shared central electronic storage of the CEC, including both to MS and ES. A COEX, itself, may be comprised of one or more instruction streams in one or more processors. The COEX local storage can receive the code modules (program instructions) and its required data, and execute them entirely in the COEX. The COEX local storage may be shared by the COEX instruction streams, or the COEX storage may be private to a single COEX instruction stream. Also, the COEX may contain specialized hardware to accelerate certain COEX operations involved in performing the offloaded functions. The COEX storage can not be accessed by the CP hardware.

Code modules must be coded or compiled to the COEX architectural specification for the particular COEX instruction stream where the code module is executing, in order to successfully execute there. The selection of a particular COEX instruction stream for a particular code module may be done selected automatically in the COEX according to whatever COEX instruction stream happens to then be available. Alternatively, the COEX instruction stream may be designated in the CP request to the COEX. In both of these cases, the CP request must specify the code module to be executed by the COEX for performing the requested offloaded work.

A COEX control program controls the operation of hardware elements of the COEX, manages interactions between the COEX and the host OS, and provides services needed by code modules executing in the COEX environment. The COEX control program executes in the COEX to coordinate COEX operations with the CEC host OS executing in the CPs of the CEC.

Each code module is provided to the COEX as an address specified in a CP request to enable the COEX to locate the code module in the CEC central electronic storage (i.e. CEC shared storage).

The CEC host operating system may support the operation of multiple independent programming subsystems and applications in the CEC. The host OS also controls the actual signalling to the COEXs of CP requests for COEX operations. Programming subsystems (operating under the host OS) make requests for COEX invocation to the host OS, which operates through a CP to electronically relay the CP request from a subsystem program to the COEX hardware.

The host OS has the main responsibility for maintaining data access control in the entire CEC. That is, the host OS is an intermediary between the application programs, their subsystem programs, and the COEX.

In a simpler CEC, there may be only a single OS controlling the entire system. Then, the single OS acts as both the host OS and the subsystem OSs for providing the software-to-software and software-to-hardware interfaces to the COEX.

The host OS supplies constraint information for each CP request to a COEX to prevent the COEX from accessing parts of real storage which should not be accessed by the COEX. This constrains COEX accesses when executing a code module to only data that should be available to the application and its subsystem which caused the invocation of the code module, and these constraints apply to both the COEX processing and to processing in the CPs for the specified code module.

Thus, the invention causes the host OS, the subsystem OSs, the CPs in the CEC, and the COEX to all work together to maintain correct operations in the system, and to maintain data integrity. Thus, even though a code module is specified by an unprotected application or subsystem, all subsystem requests are filtered through the host OS which adds constraints that prevent COEX execution of that module from damaging data in storage, or violating overall CEC system integrity.

In addition, the host OS may provide and maintain COEX queues for receiving CP requests as part of the software-tohardware interface. These queues may be accessed by the COEX OS for assigning work to the COEX instruction streams. The queues may be shared by a single COEX, or by a set of COEXs in a CEC.

Each instance of invocation of a COEX is independent of any other, allowing multiple independent programming subsystems to make requests of one or more COEXs, without the COEXs being allocated specifically to particular subsystems. The host OS is responsible for dynamic scheduling of operations to the COEXs. An host OS service is provided for the purpose of receiving requests for COEX operation, providing queueing of requests for COEX operations as made necessary by busy COEXs or busy hardware paths to COEXs, providing information which is used by the COEX to constrain its CEC storage accesses for the particular request, signalling the COEX of a new operation to be performed, receiving completion signals from the COEX, handling hardware error reports, and notifying the requesting subsystem of the completion and ending status of requested operations.

A COEX may serve plural programming subsystem alternately. Information that may remain cached in the COEX after completion of a COEX operation is a set of code modules and control data tables, which may remain cached in the COEX local storage in which they are differentiated by a COEX logical directory supported by operating partitions in COEX local storage.

Multiple OSs may operate in a CEC under the host OS to share the CEC's hardware configuration by using hardware partitioning hardware/software, e.g. the IBM PR/SM system.

Multiple COEX processors may be provided in a COEX, and these COEX processors may be general-purpose processors (although they may have different architectures). The COEX processors are tailored to specified functions by having them execute different coded programs. These code modules execute in the respective COEX architecture environment. The same function may be performed by any of different code modules coded in the respective architecture of the assigned COEX processor. The required code module may be specified by a the host program in the CP request to the COEX. An advantage of having the same architectures for all COEX processors (even though the COEX processors have a different architecture from the CPs) is that only a single code module then needs to be provided for each offloadable function. Of course, the COEX processors may use the same architecture as the CPs, but the advantage of having the COEX processors with a different architecture is that the smaller size of COEX processors (compared to CPs) may find that lower cost small commercial processors may be most economically used as the COEX processors.

It is therefore a primary object of this invention to offload functions of CPs to COEX processors as requested by programming subsystems. Such a subsystem may be authorized to use a COEX for offloading one or more functions specified by respective code modules for execution in the COEX to perform the desired functions. Different programming subsystems may offload different functions, and different versions of the same subsystem may require different versions of the same code module. Allowing that kind of variability permits, for example, a programming subsystem to change data formats from one version or release of the subsystem to the next, and still offload work from a CP to a COEX.

Also, there are CP functions that require different control data tables to be accessed, and the execution of such functions also can be offloaded from a CP to the COEX by putting needed control data tables in code modules for different COEX invocations. Thus, code modules may contain control data and/or executable program code. For example, some data compression/expansion algorithms require a different data dictionary to be used for compression/expansion, depending on the data being processed. In order to provide broad flexibility with regard to functions to be performed by a COEX using such control data during particular invocations, code modules with control data tables are obtained from the main storage, or an expanded storage, of the CEC, as requested by a the host control program. In such case a COEX execution for performing a unit of CP offloaded work may require initialization of the COEX with plural code modules-such as one containing code for a requested function and another containing control data for the requested function.

Hence, each request for COEX invocation may specify one code module name, its function level or version, containing program code; and the same request may specify another code module containing a control data table name and version. Further, the request for COEX invocation (CP request) may use CP virtual addresses for these code modules in CP shared storage storage to enable COEX access to them, should that be required. The programming subsystem may provide this information to the OS in its invocation request, and this information may be made part of a CP request to the COEX by the host OS.

The form of each CP request to the COEX may comprise a COEX operation block (COB) having an module oken denoting both the function and version of module content, e.g. for executable code or control data table being requested. This structural form permits the host OS to change algorithms used for a function in a COEX code module for an offloaded function, to change data formats, and to change sets of control data tables over time without impacting the COEX hardware design. The COEX code module may also contain operation control blocks and addresses of a parameter list (PARMLIST) that specifies virtual addresses in CEC storage for data that is to be processed by the COEX in performing its functions, and further may include CEC virtual addresses at which COEX processing results should be stored.

In order to improve the performance of the COEX invocation process, the COEX storage may maintain a logical cache (in the COEX local storage) of the most recently executed code modules (code, control data tables, and other control data). On each invocation, the COEX searches its cache for specified module(s) in its cache, and only accesses modules from the CEC shared storage if a requested code module is not already available in the COEX cache. The caching, and retrieval of not-found items from CEC shared storage, may be automatically done by the COEX, with no interaction with the host OS or with any programming subsystem. The COEX MAY maintain a cache directory containing its cached code modules (and their programs and control data tables by code module names and versions).

A preferred implementation allows only the originally requesting programming subsystems (or host OS) to use a cached code module program or control table. This is enforced by the COEX through use of its cache directory. For such operation, the directory entries also contain an indication of the requestor and how each cached module was used. The directory information allows COEX storage management to decide which entity should be overwritten in the COEX cache storage when the cache is full, and a new request has been received for a code module not in the cache.

The new code module must be assigned storage in the COEX and copied there from CEC shared storage for execution. COEX storage management then decides where the new module will reside in COEX local storage, and what it will overwrite when that is necessary.

Thus, the COEX cache (in the COEX local storage) contains copies of code modules which have been recently required by COEX operations, and saved on the expectation that they may be used again in future operations.

Accordingly, different invoking programming subsystems, or the host OS, may share the same hardware COEX using the same or different code modules, different versions of the same code module, containing the same or different control data tables for each invocation. The COEX may provide the proper module and control table for an execution without necessarily loading the required code module from CEC shared storage.

The COEX hardware is preferably operated with a plurality of "logical coexecutors" (logical COEXs). Before operation of logical coexecutor can begin in a computer system, they must be recognized by the software-to-software interface and the software-to-hardware interface is the computer system. Logical COEXs must be set up and initialized. The logical COEXs of the subject invention can use the software-to-software interface and the software-to-hardware interface disclosed and claimed in prior filed application Ser. No. 08/073,815, now U.S. Pat. No. 5,377,337, to communicate between the CEC host OS and the logical coexecutors.

To use these ADM type of interfaces, the logical coexecutors may be initialized using initialization procedures disclosed in application Ser. No. 08/073,815, which are used in the preferred implementation of the subject invention.

Yet the subject invention is fundamentally different from the invention disclosed and claimed in Ser. No. 08/073,815, now U.S. Pat. No. 5,377,337. For example, the ADM in application Ser. No. 08/073,815 now U.S. Pat. No. 5,377,337 executes only predetermined functions (i.e. the ADM and I/O functions) not involving any dynamic transfer of a code module to the coprocessors. On the other hand, the COEX in the subject invention does not use predetermined functions, because its CP requests are dynamically determined by code modules which dynamically provided to define each function (which may be later or prior written programs) for any COEX operation.

A logical COEX is setup by the host OS initializing a unit control block (UCB) to represent each logical coexecutor. Each logical COEX is associated with a subchannel (SCH) used for intercommunication between the host OS and a logical COEX. A chain of UCBs and a queue of requests are established for all the logical COEXs since any one of them can service any request. However, the UCB chain and the request queue for these COEXs is separate from that for any ADM coprocessors (COPs), since the logical COEXs do not perform ADM requests, and the ADM COPs are not capable of executing specified programs from CEC storage. Nonetheless, the OS structure and processing for these COEXs is exactly as shown for ADM COPs in FIGS. 1, 2, 3A, 3B, 4, 5, 6, 7A, and 7B in application Ser. No. 08/073,815, now U.S. Pat. No. 5,377,337, which is incorporated by reference herein, except that a different UCB queue and request queue are used for the logical COEXs than those used for ADM COPs. A new SCH type is defined for a functional COEX SCH, and differentiates them from I/O SCH's, ADM SCHs and other types as explained in application Ser. No. 08/073,815, now U.S. Pat. No. 5,377, 337, the OS generates UCBs based on operational SCHs found at system initialization time, through the use of the S/390 Store SubChannel (SSCH) instruction. The SubChannel Information Block (SCHIB) returned by that instruction indicates the SCH type. The logical COEXs have a unique type, for example, 4. The logical COEXs are invoked through any SCH of that type that is not already busy doing a previous operation.

After a logical COEX UCB queue is built, requests for COEX operation may be received by the CEC OS through the software-to-software interface using a parameter list from a programming subsystem. The host OS converts the parameter list to an interface form required by the COEXs, adds necessary system information and places the request on a request queue. This host process may include a translation of address space or hiperspace identifications to Segment Table Designations (STDs) in a S/390 embodiment, and may include the provision of other access authority information, e.g., CEC storage keys to be used for accesses by the COEX to CEC storage. Each STD defines system tables that relate how the virtual addresses in a single address space can be translated to real addresses.

As explained in application Ser. No. 08/073,815, now U.S. Pat. No. 5,377,337, for ADM COPs, if a logical COEX UCB is not busy, an Operation Request Block (ORB) is built, pointing to the COEX Operation Block for the request to be issued to the COEX, and the ORB is addressed as the operand of a Start Subchannel (SSCH) instruction. An indirection may then be used through the I/O subsystem: The execution of the SSCH instruction may cause the operation to be queued for the I/O subsystem in a hardware request queue, and the I/O subsystem is signalled. The I/O subsystem then notifies the COEX that a request is pending for it in the queue. Then the queue used is the same as that used to communicate all I/O requests and ADM COEX requests to addressed SCHs. Completion or termination of an operation will be communicated back to the host OS. An operation that ends is identified by its SCH number addressed when the COEX operation was originally invoked.

Then in the preferred implementation, when an COEX operation is completed or terminated, it is reported by an I/O interruption by the COEX hardware to the central processors of the CEC, in accordance with S/390 I/O architecture. One of the central processors will accept each interruption signal and provide it to the host OS by means of a S/390 I/O program interruption. In the logical COEX operations the S/390 Test Subchannel instruction, the Interruption Request Block, and the Subchannel Status Word all have the same format and play the same role in operation completion interruption processing as they do for ADM COP operations, as explained in application Ser. No. 08/073,815, now U.S. Pat. No. 5,377,337.

The interruption-handling OS software makes the work unit that generated the completing request ready for dispatch for execution on a central processor of the CEC. The logical COEX request queue is examined for work pending a free UCB and corresponding SCH, and if there is a work-request pending it is assigned to the newly-freed UCB for an invocation of the COEX. Other central processor host OS processing is also as described in application Ser. No. 08/073,815, now U.S. Pat. No. 5,377,337.

Together, the COEX hardware and control program handle all interaction with the CEC processors and storage, including data access and signalling. The COEX control program provides a set of services to be used by the code modules executing there. These include CEC data access services to obtain data or to return results to the shared CEC central electronic storage, MS or ES. On invocation of execution, the COEX establishes the specified code module for execution of the request, makes any specified control data table addressable to the module in the COEX local storage, and also makes the operation control block information that is of interest to the code module addressable to it in COEX local storage. For example, this would include the virtual address and extent of any CEC storage area containing data that is to be processed in the COEX by the specified module. However, this data must be accessed through the available COEX CEC storage data access services in order to maintain the same level of system data integrity as that which would prevail if the function were executed in the CEC central processors. Because the code modules may be cached in the COEX local storage, and they must be preserved there in unchanged state, the code modules, including any control data tables, are protected as read-only during module execution, or a copy is made to be used for each instance of module execution where COEX hardware does not provide read-only storage access operation. Then the code modules execute in the local COEX storage as their working storage. Also, in response to module execution requests, data may be fetched from CEC shared storage and made available in COEX local storage for use by the module. Execution results are created in COEX local storage, and returned to CEC shared storage through use of COEX CEC storage access services, by request of the logical module.

The COEX hardware provides local storage access controls and restricts access to each code module to the storage area occupied by the module so that errant execution in a module cannot compromise overall system data integrity or system availability by overwriting the COEX control program or by incorrect use of a privileged operation outside of the area of the executing module. Privileged operations for a module are performed by the COEX control program in performing services for the code module so that system integrity is not compromised. In the preferred embodiment, the COEX has the capability to protect some of its own storage as read-only, and to have code modules execute with COEX virtual addressing, in order to constrain COEX storage access. By not defining COEX control program elements in the module virtual addressing domain, they are protected from improper access.

Two kinds of virtual addressing are involved in code module execution: COEX-local, and CEC shared storage access. COEX-local virtual addressing is used in the computational instructions of the module as it performs its calculations and is used to access operands in COEX-local storage and to refer to instructions of the module itself, e.g., branch locations, program constants. These virtual addresses translate to locations in COEX real storage. In CEC-storage requests by the COEX control program, the code module specifies CEC virtual addresses to the CEC shared storage locations the COEX wishes to access to obtain data, and in order to return COEX results to the CEC shared storage.

To access the CEC shared storage, the COEX control program uses CEC address translation, which it performs using CEC translation tables specified to the COEX when it is invoked by the CEC host OS. In S/390 architected systems, for example, a Segment Table Designations (STD) is provided to the COEX to identify a virtual address space involved in a COEX request which is supplied by the CEC host OS as part of an operation control block associated with the CP request to the COEX. The STD locates the translation table in the CEC shared storage which is used by the COEX control program to translate CEC virtual addresses, supplied with the code module in to enable the COEX to access the CEC shared storage. CEC segment and page tables are then accessed in CEC storage as required to translate the virtual addresses. This Dynamic Address Translation (DAT) process used is explained in U.S. Pat. No. 5,237,668 herein incorporated by reference. The COEX hardware, under the control of the COEX control program, performs such CEC address translation, for accessing CEC shared storage to fetch and store data, using absolute addresses obtained from the address translation. These accesses may use CEC storage keys, supplied by the CEC host OS at COEX invocation time to maintain system data integrity.

In the preferred embodiment, the S/390 Start Subchannel (SSCH) instruction is used to signal a COEX that there is a work request to be performed. A parameter of the SSCH instruction is an Operation Request Block (ORB), which contains an address in CEC storage of a COEX operation block. This block contains a list of STDs, one for each CEC address space to be accessed in the requested operation. The code module to be executed is specified by a Token. The token represents the function of the module and the version of the code module. The module address (address space STD and virtual location within space) and module length are specified in case the COEX does not cache the code module in COEX local storage and must again retrieve it from CEC storage. (A requesting subsystem does not assume that a specified module will be cached in COEX storage). The COEX operation block contains an address to a parameter list (PARMLIST) which contains the CEC virtual addresses and extents of all CEC data areas which may be accessed by the COEX for the code module for fetching input, and storing results.

Accordingly, the PARMLIST specifies the tokens of programs and control data tables in the code modules be used during COEX execution. The token represents the function and version of the program and control data tables. The token is used when the COEX control program services request access to these CEC shared storage areas. The address of a control block feedback table in CEC storage may be specified so that a code module may report results and statistics, etc., back to a requesting programming subsystem in the CEC, using such COEX services. The COEX control block also may include a response area for information of interest to the CEC host OS or to the COEX OS invocation service, which may be invoked by COEX hardware conditions, or errors in host OS-supplied information in the invoking interface. The COEX operation block is found in the CEC host OS storage, and is accessed by the COEX OS as part of an invocation. CEC shared storage areas specified by a PARMLIST are preferably kept by a programming subsystem in its assigned storage area; then the COEX may accessed them in CEC storage through the COEX data access services when executing a code module.

SUMMARY OF THE DRAWINGS

FIG. 2 illustrates an application or subsystem request to the operating system. The request specifies an application or subsystem-generated module to be loaded and invoked on a coexecutor, which specifies a parameter list specifying the inputs and outputs of the asynchronous coexecutor operation to be performed, and which specifies a set of control data tables to be used during the operation.

FIG. 3 represents a parameter list (PARMLIST) containing input and output parameter specifications to be used during the execution of a code module in the coexecutor.

FIG. 4 represents a list of control data table specifications to be used during the execution of a module on the coexecutor.

FIG. 6 represents a coexecutor operation block header which is part of the COB of FIG. 5. This header specifies the command and storage keys to be used.

FIG. 7 shows the structure of a Coexecutor Specification Block (CSB) which specifies a virtual address space Segment Table Descriptors (STDs), the virtual address of the input/output data parameter list, the virtual address and length of the module to be loaded and executed on the coexecutors, the virtual address of a list of control data tables, and the invoking program identifier (ID) to be used for the current invocation of the coexecutor.

FIG. 8 shows the structure of a coexecutor response block within the COB which is used to return code module execution and storage-access exceptions to the operating system for resolution.

FIG. 9 shows the structure of a cache directory of modules and control tables loaded into the coexecutor storage during operation.

FIG. 14 shows the structure of a CEC storage request made by the execution module to the control program in the CFP for GET or PUT access to the main store or expanded store of the CEC.

DETAILED DESCRIPTION OF THE PREFERRED EMBODIMENT

Figure 1:
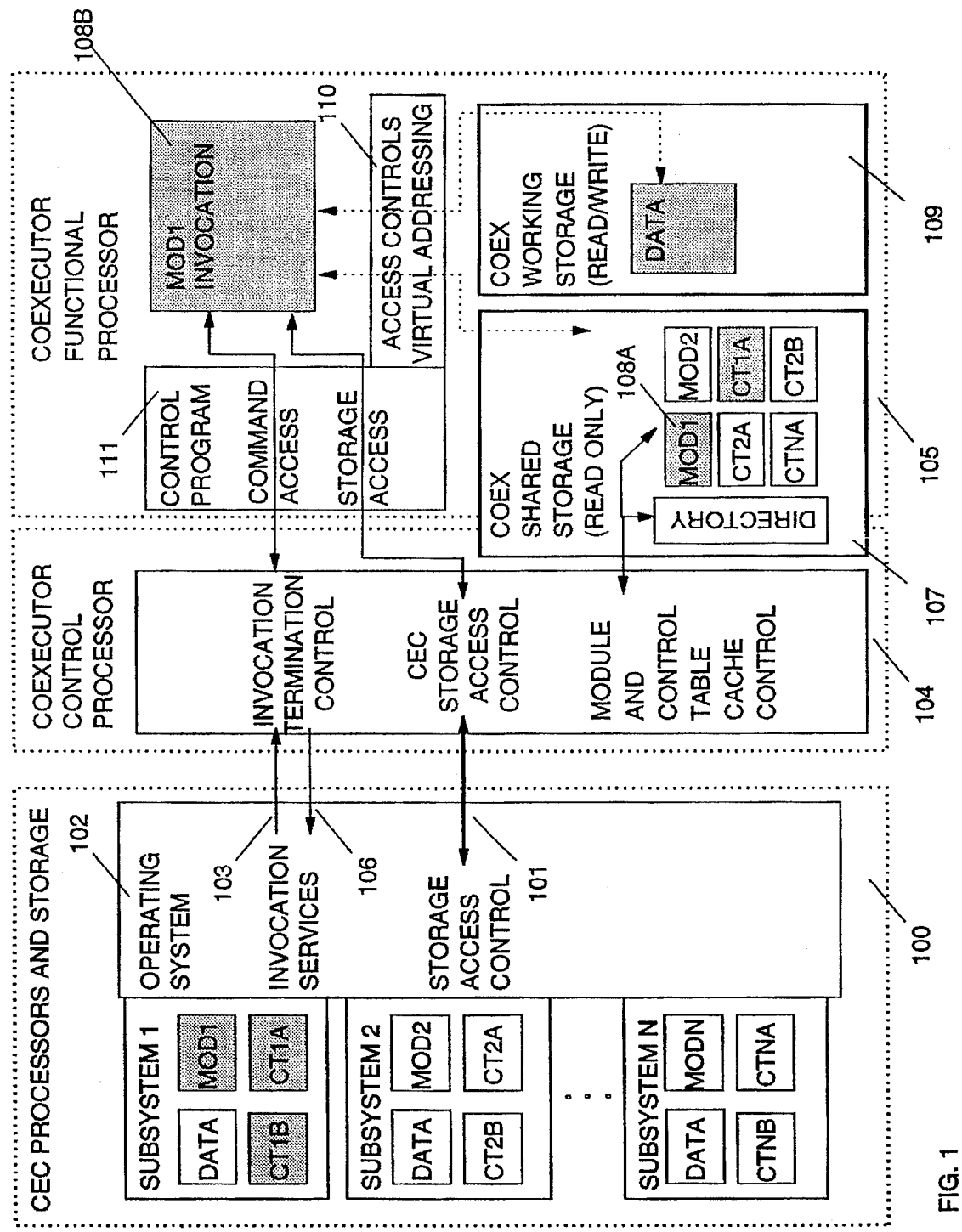
FIG. 1 illustrates the structure of a Central Electronics Complex (CEC) of a general purpose computing system containing central processors, under control of an operating system, executing programming subsystems which are providing and invoking code modules to be executed on an asynchronous coexecutor within the CEC.

The major elements of the preferred embodiment are shown in FIG. 1. Box 100 contains the elements associated with the central processors of the CEC. As an example, three programing subsystems are depicted, subsystem 1, subsystem 2, and subsystem 3.

They are in CEC storage, executing on the CEC central processors. Modules for execution in a functional coexecutor (COEX) are illustrated by Mod1, Mod2, and ModN. Control data tables to be used during COEX operations are illustrated by CT1A, CT1B, CT2A, CT2B, CTNA, and CTNB. Thus, by example, when subsystem N invokes a functional COEX it may specify MODN and either CTNA or CTNB (or both, depending on the function of MODN), as the code and control data to be used in the execution of that invocation of the COEX. MODN, CTNA, and CTNB are present in the electronic storage of the CEC, either in main storage (MS), or in expanded storage (ES). For execution in the COEX, these must be copied to the local storage of the COEX, if they are not already there. The COEX has direct hardware access to CEC storage, as illustrated by line 101, and provides caching of these entities automatically within the coexecutor local storage. Box 102 shows the trusted, privileged elements which maintain the operational integrity and data security of the entire CEC by isolating each subsystem to its own data and operational domain. The Operating System (OS) and its COEX invocation services and data access control elements are located here. Unique system-wide tokens for the COEX modules and control data tables are provided here by qualifying the tokens provided by the subsystems to the OS so as to make them unique to that operating copy of the subsystem. For example, a unique indicator of the the operating system address space in which the subsystem is executing can be appended to the subsystem-provided token to make it system-wide unique.

A COEX is invoked for execution by a signal over line 103, which notifies the COEX to examine the standard S/390 I/O operation queue in the standard, previously defined, method in order to obtain the particulars of the present request. The COEX is depicted as two operational engines, 104 and 105. A Coexecutor Control Processor (CCP), box B, handles all direct communication with the CEC, including signalling and accesses from and to the electronic storage, MS or ES. A Coexecutor Functional Processor (CFP) executes the module copied from CEC storage. These engines execute asynchronously of each other. The CEC storage is used for intercommunication of information between the central processor operating environment and the COEX operating environment. Signals, over lines 103 and 106, in FIG. 1, notify one or the other environment that new information must be examined. Line 103 is used for invocation signals to the COEX, line 106 is used for completion signals to the CEC. Line 101 is used for accesses from the COEX to the CEC electronic storage either as part of the initiation and termination processes, or in fulfilling code module requests for the fetch or store of operand data. The two operating engines of the COEX, depicted by Boxes 104 and 105, intercommunicate through the COEX storage which is shared and directly accessible by both. However, the COEX local storage is not directly accessible by the central processors of the CEC. Signalling between the engines is performed on the line labelled "command access" in the figure.

The two COEX engines operate asynchronously to each other, in that one, the CCP, may be interacting with the CEC storage while the other is executing a functional module. This allows CEC data access by the CCP to be concurrent with the execution of the functional module by the CFP. The CCP receives all CEC invocation signals, translates tokens supplied on the invocations, and provides the control program executing on the COEX Functional Processor (CFP), whose major elements are shown in Box 105, with addressability in COEX local storage to the module and control data table(s) specified. Where those entities are not present, the CCP will obtain them from CEC storage. The COEX storage is shared by the CCP and the CFP. Both may access it directly. If either a required module or a control data table is not in the COEX, it must be retrieved from CEC storage. The CEC virtual address of the module and table(s) are part of the invocation parameters. CEC DAT is performed in the CCP to find the real address in MS or ES of the missing entity, and it is accessed there, brought to COEX storage, and added to the COEX directory. If the read-only storage reserved for the caching of modules and control data tables is already full, the entity least-recently used is overwritten and removed from the directory. If that would not provide enough space, a second entity is overwritten, etc., until enough space to hold the new entity is found. The storage for the caching of COEX modules and tables supplied from CEC storage is shown as Box 107 in FIG. 1. The translation of CEC virtual addresses and the associated access to CEC electronic storage to obtain required elements there is performed by CEC Storage Access Control in Box 104 of FIG. 1.

Box 104 also provides the invocation and termination control for COEX operations requested by the OS running on the central processors of the CEC. It receives the signal that a new operation has been requested, accesses the Operation Request Block (ORB) in CEC main storage, obtains the address of the COEX Operation Block (COB) from the ORB, and uses it to access the COB, which is fetched from CEC storage and put into COEX storage. The address specification of the PARMLIST is obtained from the COB and translated to a CEC absolute address, using the CEC DAT process, provided in CEC Storage Access Control in the CCP. The resulting absolute address is then used to access the PARMLIST in CEC storage, MS or ES, and put it into COEX storage, using the specified application or subsystem CEC storage key specified in the COB header. The PARMLIST is in the application or subsystem CEC storage, and is made addressable to the code module for its execution in the COEX. It contains the specification of CEC virtual addresses to be used in its requests to the COEX control program for input data, or to return results and feedback to CEC storage for use by the invoking programming application or subsystem.

Box 108A represents a cached copy of the specified module, in COEX storage as a result of its execution during a previous operation, to be saved for future executions after the current one. Box 108B represents a particular instance of execution of the module 108A. It includes specific information as to the current state of execution of the module, e.g., instruction counter, register content, operating mode, etc. The physical code being executed is read-only in this embodiment, but a copy may be used in an alternate embodiment where read-only hardware controls are not available in the COEX hardware. In such a case, module 108B would be a COEX-storage copy of module 108A plus the execution environment of the state information of the particular instance of execution. Box 109 illustrates a read-write portion of COEX storage that is made available to the COEX module for working storage during its execution. Box 110 depicts the use of COEX virtual addressing and other COEX storage access controls such as storage keys, or boundary-constraint addressing, which are used to maintain the integrity of the COEX control program, its working data, and the cached modules and control data tables. This restraint is necessary for the COEX to properly perform its role in defending the overall system operating and data integrity, by preserving the integrity of the COEX operating environment. Otherwise, the COEX could be used to compromise the integrity of the CEC central processors or storage.

Box 111 depicts the COEX control program, and the services it provides for the operating functional module. All CEC storage accesses required for module execution are requested by programming calls from the module to the privileged storage access function of the control program, which properly relates these to the CEC Storage Access Control within the CCP for CEC DAT and storage access. The call is performed by using a secure, authority-changing, hardware program transfer mechanism in the CFP engine, of which many types already exist in the prior art, to transfer control from the unprivileged state of the functional module to the privileged state of the COEX control program. Services are also provided to send information back to CEC storage about operation completion through the contents of the CEC storage copy of the feedback block of the PARMLIST, to signal completion or termination of module operation, or to relay messages to or from the module and the invoking program in the CEC storage.

FIGS. 2, 3, and 4 show the parameters provided by an application or subsystem in its request to the OS service routine to invoke a functional COEX to perform an operation. FIG. 2 illustrates the user request control block. The application or programming subsytem creates and passes this block to the OS COEX service routine to be used to create the service routine request for operation of the COEX on behalf of the application or programming subsystem. The control block indicates the full virtual system address of the PARMLIST, which will be accessed during COEX operations. The address consists of the Access List Entry Token (ALET) of the address space containing the PARMLIST, its virtual address within that address space, and its length in bytes. The control block also contains the token of the functional module to be executed in the COEX, and the full virtual address of the module in the CEC storage. Again, this is comprised of the address space ALET, the virtual address within the space and the length of the module in bytes. The ALET, virtual address, and length in number of entries of a control data table list, specifying the tables required to be loaded into COEX storage during the COEX operation, is also part of the request control block. The control block also contains a list of ALETs identifying the virtual address spaces within CEC storage that will be accessed by the code module as specified in the control blocks in FIGS. 3 and 4. These ALETs are referenced from those control blocks by address space numbers relative to their position in the request parameter control block, i.e., address space number 1 specifies the first ALET in the list, address space number 2 specifies the second ALET in the list, etc. In any case, the ALET may define an address space, a data space, or a hiperspace.

FIG. 3 illustrates the PARMLIST as supplied to the COEX service routine when it is called for a COEX operation invocation. A virtual address space number (in the request control block) of the ALET of the space containing the storage area in CEC storage, the virtual address within that space, and the length in bytes in the CEC storage define each of the input and output data areas to be accessed by the COEX, and also the feedback area. The feedback area can be used by the code module to report back information about the module execution to the invoking application or subsystem program, e.g., statistics about data processed, or the amount returned to CEC storage.

FIG. 4 shows the control table list, defining control tables to be used by the specified module in its processing. Each entry contains an identifying token unique in the application or subsystem, the virtual address space number of the space containing the table, and the virtual address and length of the table in that space.

Figure 5:
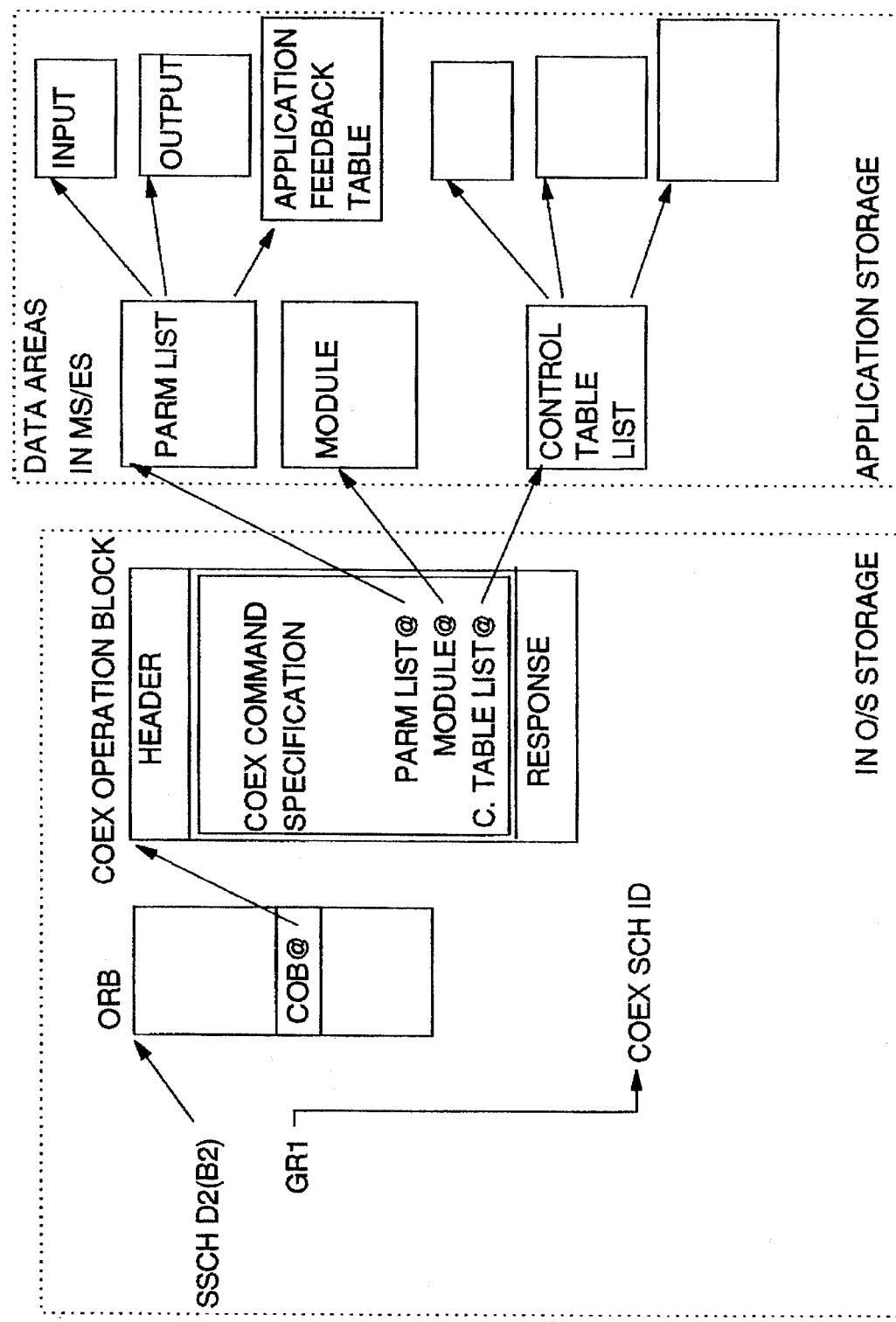
FIG. 5 shows a (SSCH) instruction with its Operation Request Block (ORB) and Coexecutor Operation Block (COB) operands that invoke the asynchronous coexecutor, including the coexecutor command specification identifying a code module to be executed on a coexecutor, the virtual addressing controls, the input/output parameters, and the control data tables to be used.

FIG. 5 illustrates the control block structure at the time of actual COEX invocation by means of a SSCH instruction. The form shown is created by the COEX service routine. The figure indicates that in the SSCH instruction general register 1 (GR1) specifies the SCH being addressed, while the effective address of the second operand specifies the ORB address. This is standard in S/390 architecture, which is used in this embodiment. However, for COEX operations the ORB contains the address of the COEX Operation Block (COB), while for I/O operations it addresses a channel program. The SCH type indicates the difference in the architecture formats. If the SCH type indicates a functional COEX, the ORB addresses a COB. The COEX service routine in the CEC OS creates the COB in protected system storage from the information contained in the user request control block. The COB is comprised of a Header section, a Command Specification Block (CSB), and a Response Block.

FIG. 6 shows the Header. It contains a reserved space for a programming parameter from the user program to the COEX module, the length of the entire COB, a Command field identifying the COB as a functional COEX COB, e.g., differentiating it from an Asynchronous Data Mover Operation Block (AOB), a relative offset from the beginning of the COB to the CSB, and the CEC storage keys that should be used by the COEX in accessing CEC storage on the functional module's behalf.

The CSB is shown in FIG. 7. The COEX service routine translates all ALETs in the request control block to Segment Table Designations (STD) and places these in a list in the CSB in the same order as in the request control block. The number of such STDs is placed in the CSB. The address space numbers in the PARMLIST and the control table list address these spaces in that relative order. This structure is used because the PARMLIST and the control table list are in user storage, while the COB is in OS system storage, where actual STDs are allowed to reside. The STDs are used by the CEC Storage Access Control element of the COEX CCP in converting CEC virtual addresses to CEC absolute addresses for accesses in CEC storage. The ALETs of the module, the PARMLIST, and the control table list specified in the application or programming subsystem request are translated to STDs and placed into the CSB with their specified virtual addresses and lengths so that they can be accessed from CEC storage by the CCP during its invocation processing. The number of entries in the control table list is placed in the CSB, also the service adds a unique identifier of the application or subsystem program. e.g., in MVS the address of the Address Space Control Block (ASCB) of the program. This will be used in the COEX directory to differentiate this program's modules and control tables from those of other invoking programs in the same OS image. As indicated, the module, the PARMLIST, the control table list, the application feedback table, and the input and output data areas remain in application storage and will be accessed there from the COEX, as required during the operation.

FIG. 8 shows the COEX response block part of the COB. It contains a defined space for an error code, and the failing space number and virtual address associated with the error code being reported. This block is used to communicate errors detected by the COEX privileged elements in performing their functions or in the execution of the code module, e.g., retrieving the specified module or control table(s), translating data addresses, etc. Examples are invalid address translations, CEC storage key violations, and code module execution errors.

FIG. 9 shows the Coexecutor module/control table directory for entities cached in its system storage. If modules or control tables specified in COEX invocations are found in the directory, the COEX storage copy can be used instead of reaccessing them from CEC storage. The directory differentiates the entities in its programmed cache by the logical partition (LPAR#) of the system partition in which the OS, that issued the SSCH instruction that caused the entity to accessed from CEC storage, is executing. Each entry is also differentiated, within a particular LPAR partition, by the Invoking Program ID obtained from the CSB of the invocation that caused the entity to be accessed from CEC storage. The Least Recently Used (LRU) field indicates how recently the entity was used by an invocation. This is used in storage management to determine which entity should be overwritten when an entity that is not present in the cache is needed for a COEX operation. The FREE field identifies directory entries which are not in use and thus are available for new cached entities. The location of the entity in COEX-local system read-only storage is found in the COEX storage address (COEX ADDR) and entity length (LENGTH) fields.

Figure 10:
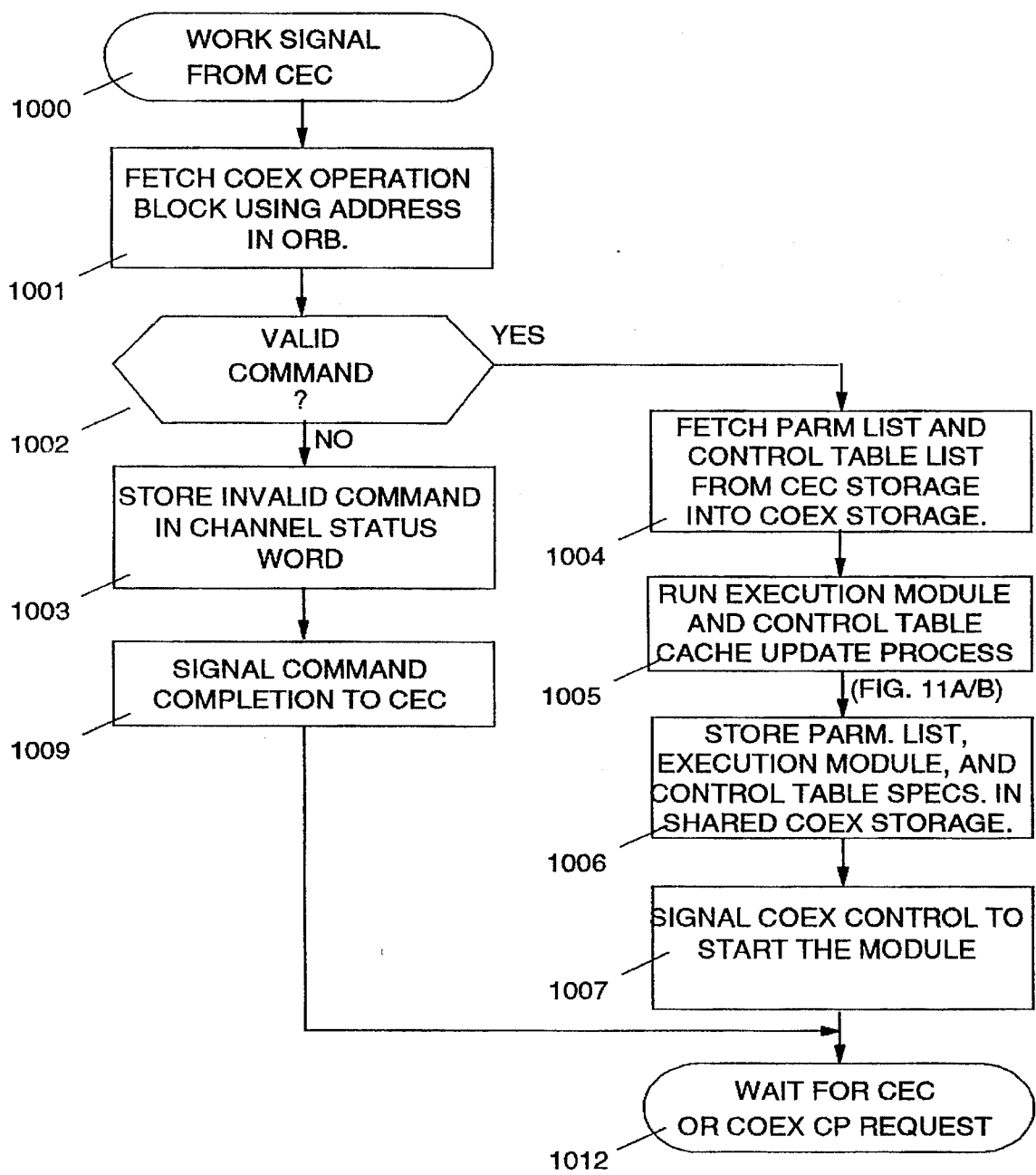
FIG. 10 is a flowchart of a Coexecutor Control Processor (CCP) invocation process after receiving a signal from the CEC to start a given command. This process is initiated by a signal from the CEC as part of the central processor execution of a SSCH instruction specifying a coexecutor subchannel.

FIG. 10 shows the processing performed by the CCP when it is signalled that a new work request has been made for its operation. The signal is received at step 1000. Using the address in the ORB indicated by the work signal, the COB is fetched by the CCP to COEX local storage in step 1001. Step 1002 tests the COB to check that it contains the operation code for a functional-COEX operation. If it does not, an invalid command indication is stored in the channel status word in step 1003, and the CEC is signalled command-completion in step 1009. In this S/390 embodiment, the OS will be notified of the completion through normal S/390 architected means. If the command code indicated a functional-COEX request, step 1004 fetches the PARMLIST, and the control table list from the CEC storage. To do this, CCP uses the STD, virtual address, and length of each from the COB. CEC DAT is performed using the STD and virtual address to find the absolute address of each entity in CEC real storage. At step 1005, the module specified in the COB is searched for in the COEX Directory, and is established for execution in the CFP. This is described in more detail in FIGS. 11A and 11B. At step 1006, the PARMLIST and control table list are stored in COEX-local storage. These will be made available to the module during its execution. At step 1007 the control program is signalled that it can start the module. Associated with the signal are the location in COEX storage of the module, the PARMLIST, and the control table list. At this point the control table list contains the COEX-local storage addresses of the control tables that were specified, so that the module may directly address them in COEX storage during its execution. After signalling the CFP, the CCP waits in step 1012 for further signals from the CEC, e.g., cancel operation, or signals from the control program for CEC storage access requests, or completion signals.

Figure 11A:
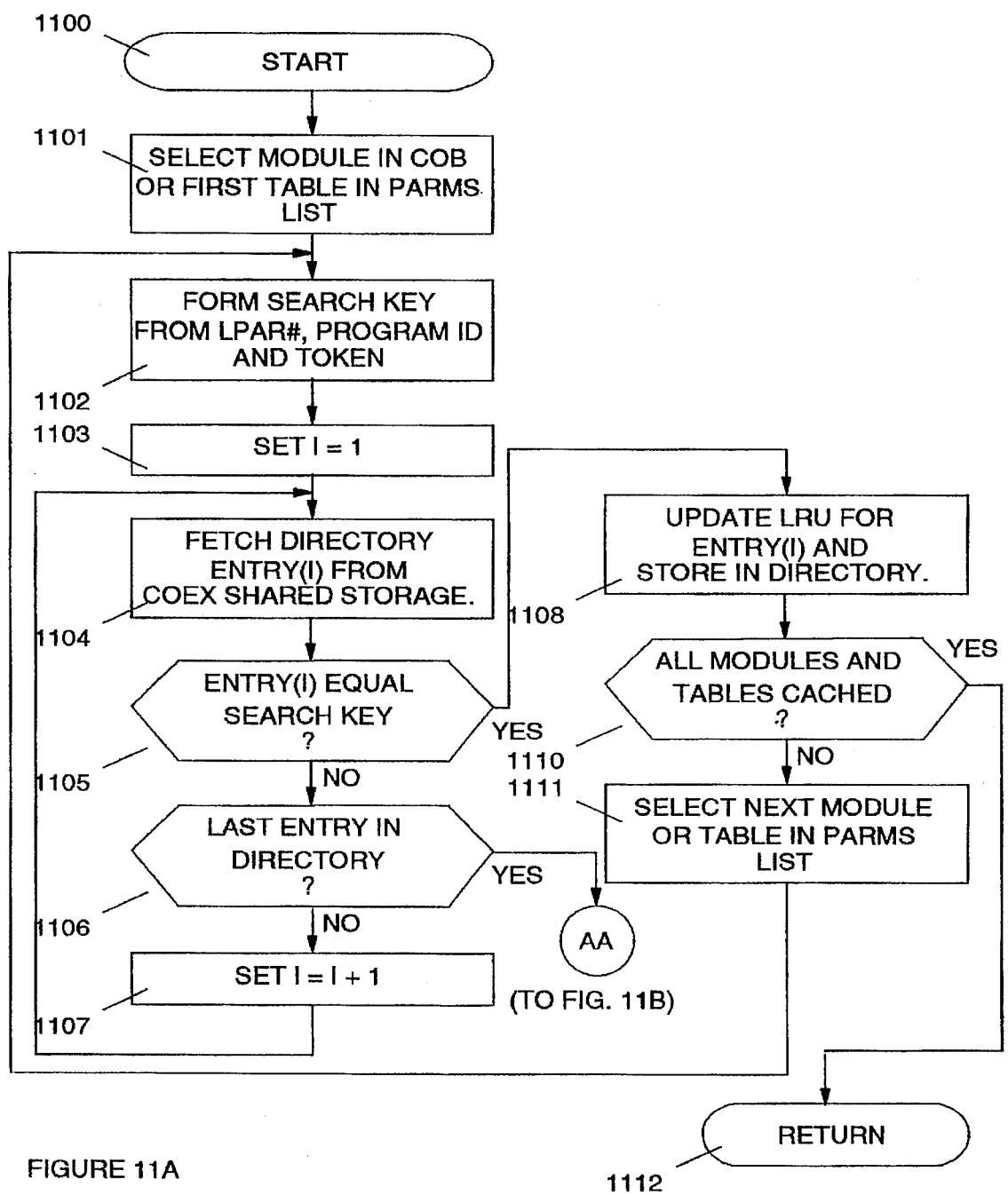
FIGS. 11A and 11b are a flowchart of the execution module and control table caching processing performed by a COEX Functional Processor (CFP) in the preferred embodiment.
Figure 11B:
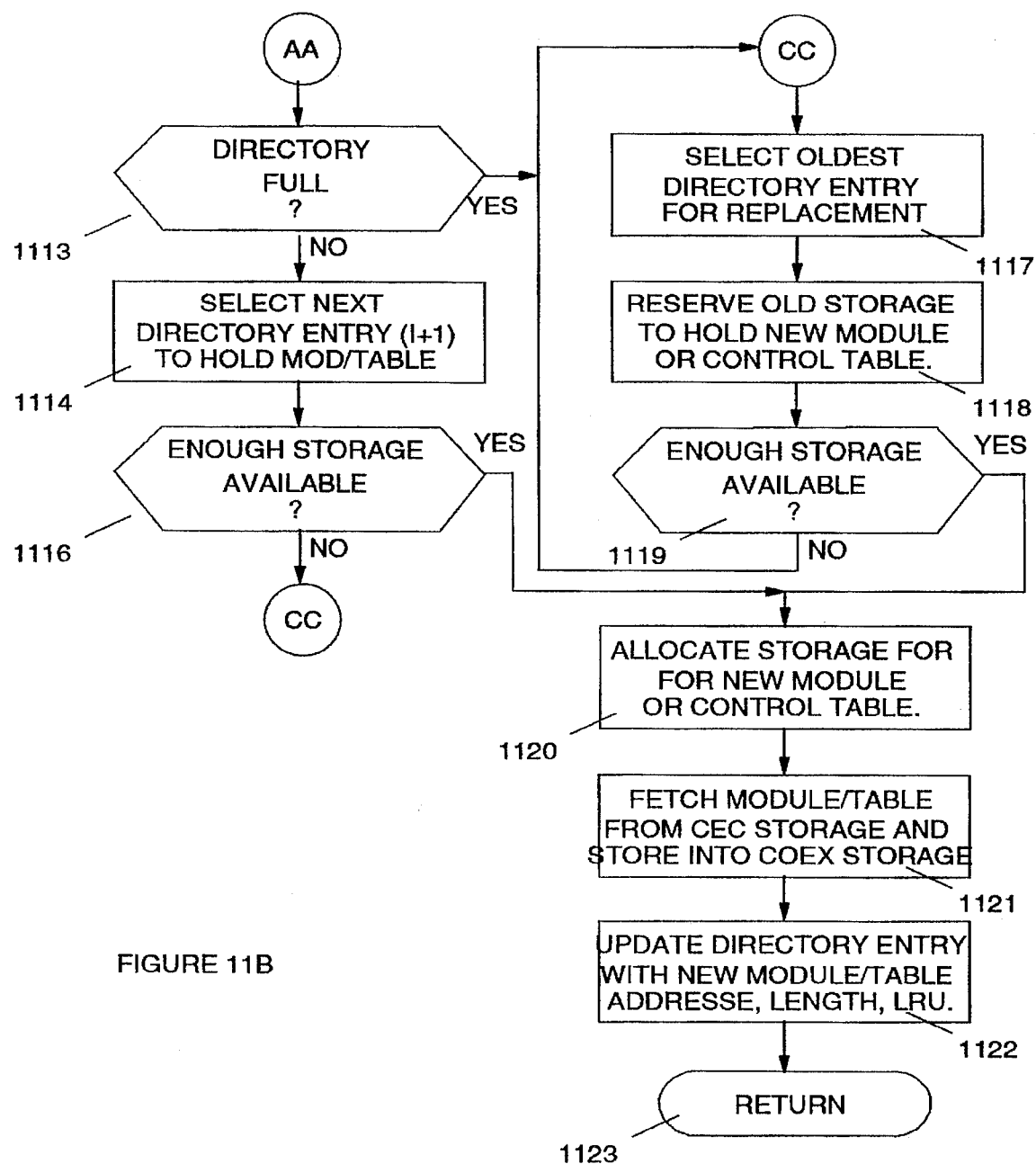

FIGS. 11A and 11B show the logic of the caching process for code modules and control tables originally fetched from CEC storage to COEX-local storage. If a specified module or control table is still available in the cached set, it will be used without fetching it again from CEC storage. If it is not, it will be fetched and its identification will be placed in the module and control table cache directory. If fetched, it may replace other entities already there in order that space can be provided in COEX storage for it. In such a case, the entities replaced are removed from the cache directory.

The caching process is entered at FIG. 11A, step 1100. At step 1101 the next entity to be searched for in the directory is selected. A token search key is formed for that entity consisting of LPAR#, Program ID, and application-supplied token in step 1102. In step 1103 a loop index counter, I, is set to 1 to step through all the existing entries in the directory, if necessary. Step 1104 obtains the I-th entry from the directory. At step 1105 this entry is compared to the search key. If it is not equal, a test is made at 1106 to ascertain whether or not the last directory entry has been tested for equality to the search key. If not, index I is increased by one for the next iteration at step 1107, and control returns to step 1104 for a compare check with the next directory entry. If the entity was found to already exist in the cache at step 1105, control passes to step 1108, where the LRU indication is updated to reflect this new use, and placed back into the directory. At step 1110, a check is made as to whether or not all entities required for the present operation have been found in the cache, or fetched from CEC storage. If not, control passes to step 1111 which selects the next entity to be searched for. Step 1111 transfers control to step 1102 for the next iteration of directory search. If step 1110 finds that all required entities are available in COEX storage, it returns to its caller in the CCP initialization process (FIG. 10, step 1006). If step 1106 checks the last directory entry and the searched-for entity is not found, control is transferred to entry point AA on FIG. 11B.

FIG. 11B is entered at step 1113 from connector AA reached from step 1106 of FIG. 11A. Step 1113 checks for a full directory. If the directory is not full, the first free slot in the directory is reserved for the new entity. at step 1114. At step 1116, free COEX storage available is checked to find if the entity will fit in the free storage available. If it will, control passes to step 1120, where the storage is allocated, and control passed to step 1121 to fetch the entity from CEC storage to the allocated space in COEX storage. Step 1122 updates the reserved directory entry reserved in step 1114 with the LPAR#, PGM ID, TOKEN, LRU indication, COEX Address, and length, and marks it as not free. Then step 1123 returns to the CCP initialization process (FIG. 10, step 1006). If step 1113 found the directory full, or if step 1116 did not find enough free space in COEX storage to cache the entity, the directory is searched for a least-recently-used entity whose space can be taken and used for the newly required entity in step 1117. (In FIG. 11B the step 1117 is reached from step 1116 through diagram connector CC). If a directory entry has not yet been assigned for the new entity, this entry is reserved for it. The space occupied by the entity selected to leave the cache is added to the free space already available in step 1118 and its directory entry is marked "free". Step 1119 checks to find if there is enough free space to hold the entity. If not, control passes to step 1117 to select another entry to provide space by leaving the cache. When enough space is available to hold the entity, control is passed to step 1120 to do the allocation of the space, before fetching the entity and putting it into the allocated space, and creating a directory entry for it in steps 1121 and 1122.

Figure 12:
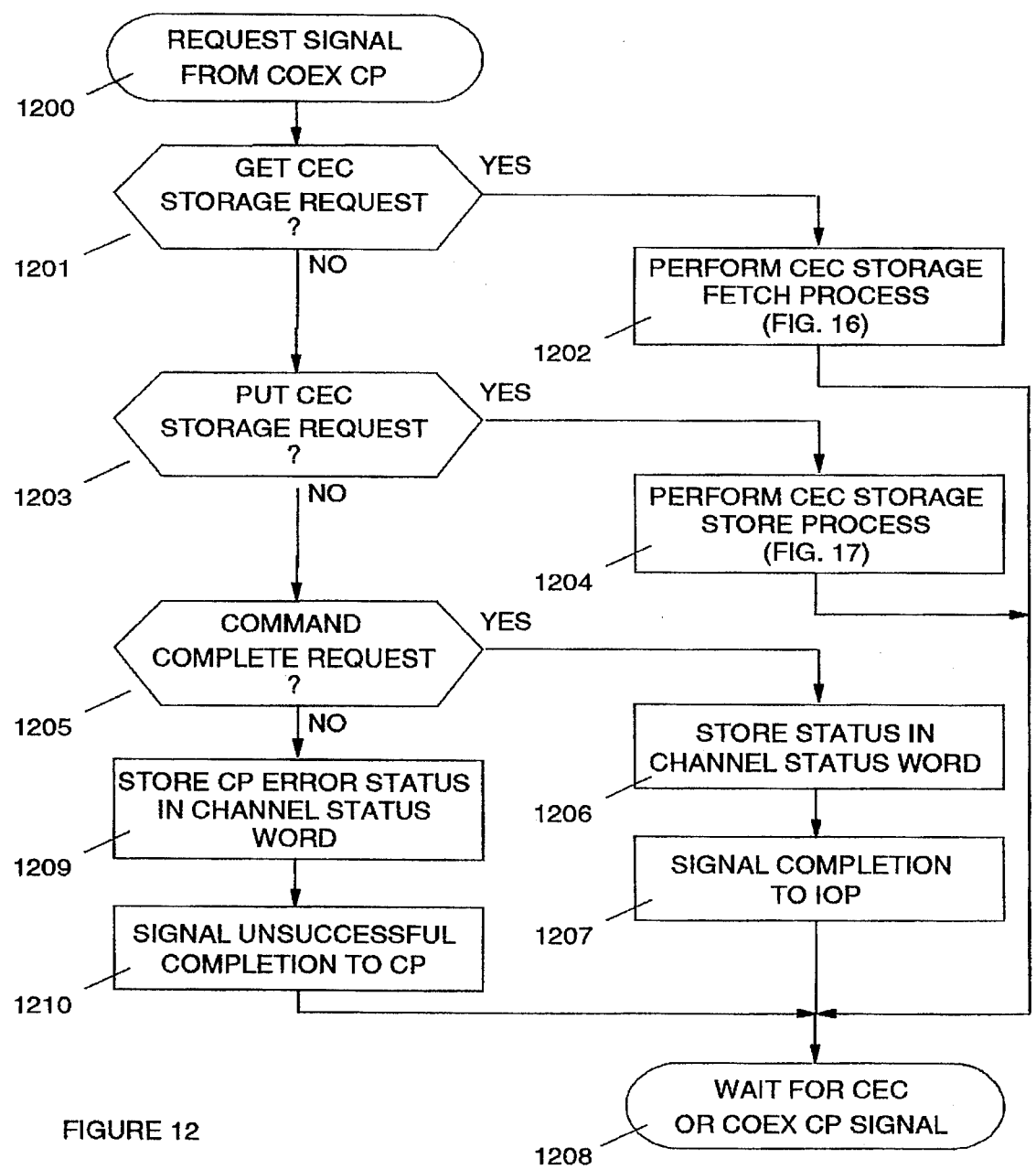
FIG. 12 is the CCP process which performs CEC virtual storage accesses and command completion requests from the COEX Control Program (CP) to the CCP in the preferred embodiment.

FIG. 12 shows the CCP processing when it receives a request signal from the control program executing on the CFP. The signal may be for a GET-from-CEC-storage request, a PUT-to-CEC-storage request, or an operation completion signal. The process is entered at step 1200 with the receipt of a signal from the CFP. Step 1201 checks for a GET request. If it is a GET, it is performed at step 1202 (which is explained in detail in FIG. 16). If it is a PUT, the store process is performed at step 1204 (explained in more detail in FIG. 17). After either step 1202 or step 1204 control passes to step 1208 where the CCP awaits the next service request. If a command-complete has been signalled, normal ending hardware status is stored in the Channel Status Word at step 1206, and the CEC is signalled at step 1207. If the control program request is not one of the defined legal operations, control passes from step 1205 to step 1209, where control program error status is noted in the Channel Status Word. The control program is signalled to perform an unsuccessful completion at step 1210. (This will be received by the module at FIG. 18, step 1800). The CCP goes into wait at step 1208 for the next signal from the control program on the CFP, or from the CEC.

Figure 13:
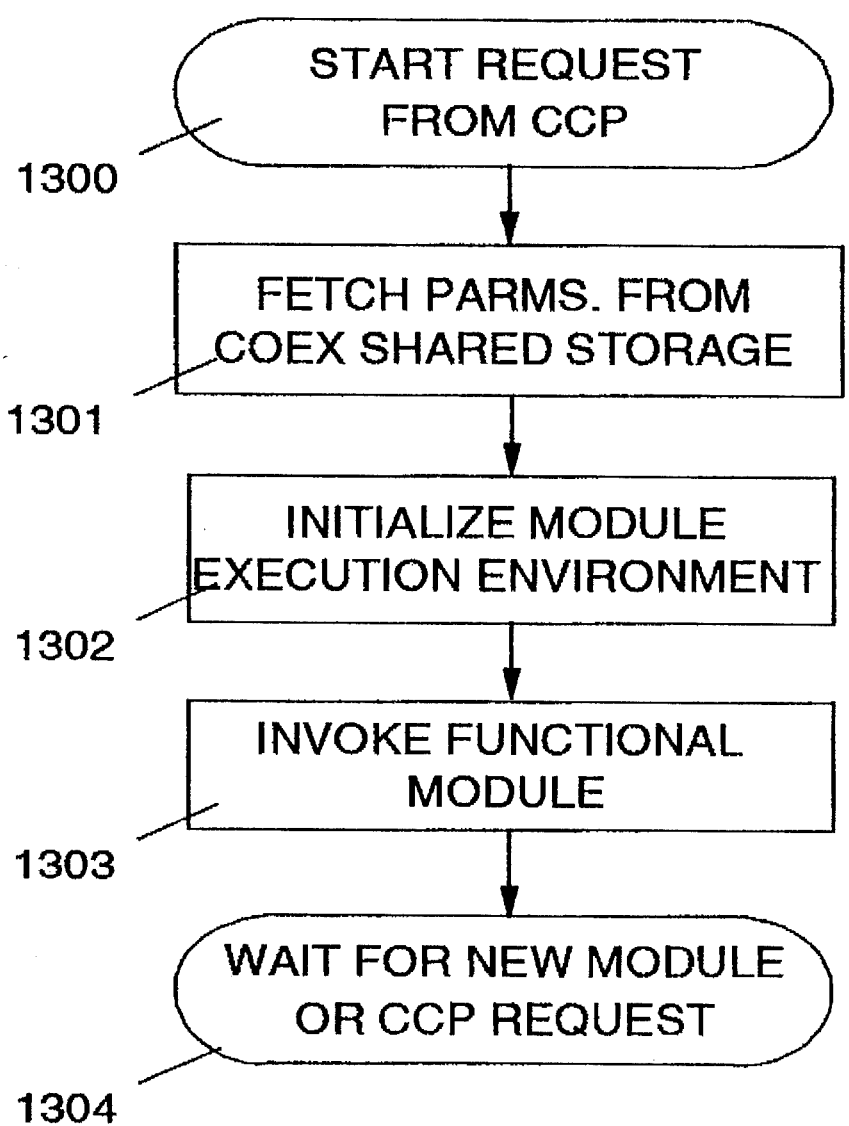
FIG. 13 is the control program process by which the execution module is initialized and invoked in the CFP upon the receipt of a start request from the CCP in the preferred embodiment.

FIG. 13 shows the processing in the control program executing on the CFP when a start signal is received from the CCP. The parameters provided in the signal data are prepared in a parameter list for communication to the code module when it is invoked. These are the location of the module in COEX storage, which, by convention, indicates its first instruction for execution; the location in COEX storage of the PARMLIST containing the necessary specification of the input, output and feedback areas to allow the module to request CEC storage accesses of the control program to those areas during the module's execution; and the address of the specified control table list in COEX storage. That list contains the addresses in COEX storage of the tables specified for the operation so that they may be accessed directly there. This information is made available to the module in step 1302, and step 1303 transfers control to the module. The module is executed in CFP unprivileged state. At 1304, the control program is dormant while the module executes on the CFP. The control program will be re-entered when the module makes a service request, or a signal is received from the CCP.

The specified format for a GET or PUT CEC-data-request by the code module to the control program is shown in FIG. 14. The operation, GET or PUT, is indicated in the parameters of the service call, as is the virtual space number, relative to the list in the COB, which list resulted from the list of ALETs originally specified in the call from the application executing on the CEC central processors to the OS COEX service routine there. This identifies the CEC virtual space that is the subject of the data access. The virtual address of the data to be fetched from the space, or stored into it, and the length of that data are specified in the parameters. The address in COEX storage where the fetched data is to be placed, or where the data to be stored is to be obtained, is another parameter of the service call.

Figure 15:
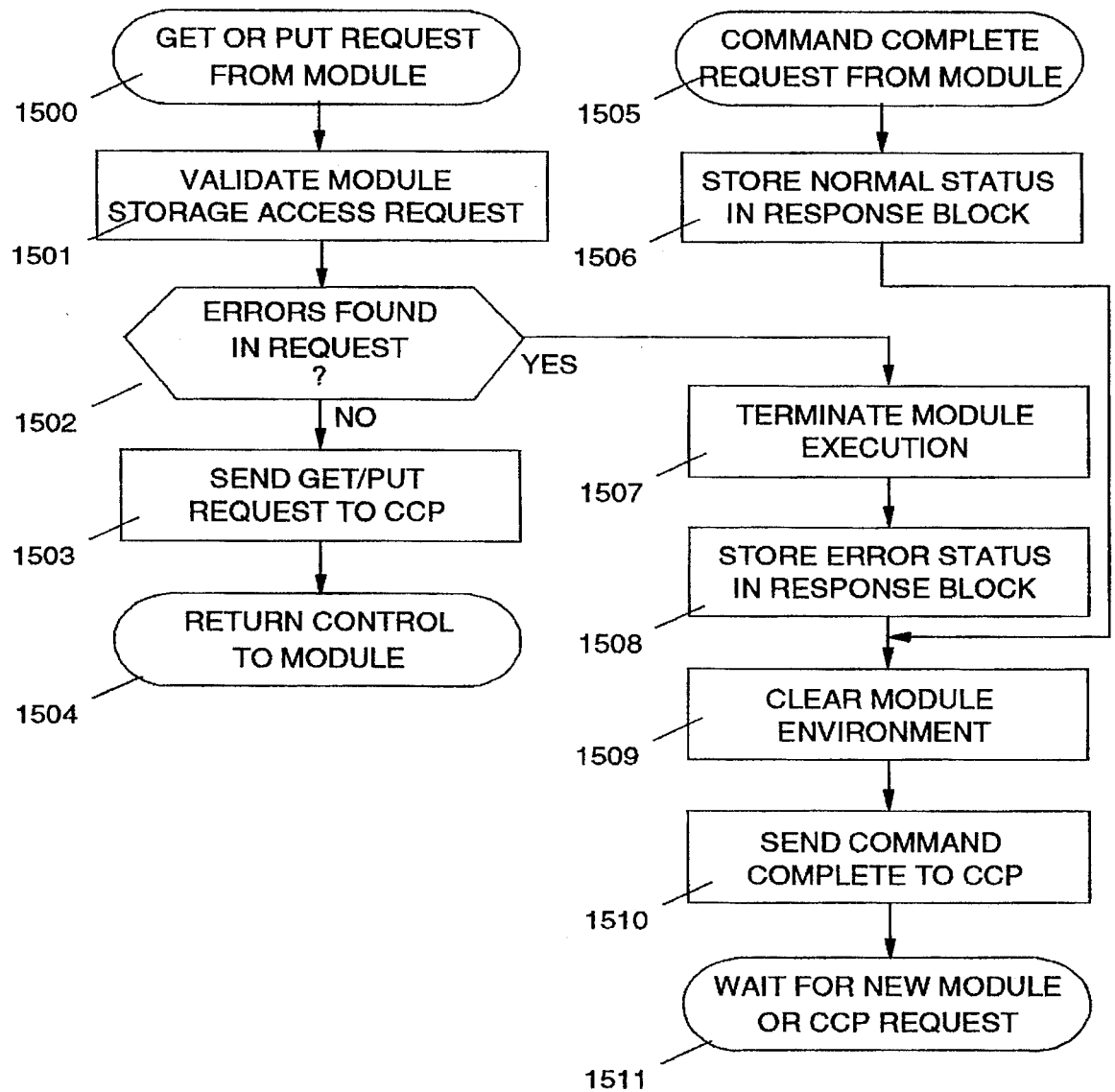
FIG. 15 is a flowchart of the GET/PUT and COMMAND COMPLETE processes executed in the control program upon receipt of a GET/PUT or COMMAND COMPLETE request from the functional module in the preferred embodiment.

FIG. 15 illustrates the processing of the COEX control program (CP) executing in the CFP when a request for service is received from the functional module. In FIG. 15, step 1500 is the entry point to control program processing when the module requests to fetch from, or store data into, the CEC storage. Validity checking of the parameters is performed in step 1501. If the checking concludes that the module contains a programming error, step 1502 transfers to step 1507 to terminate its execution. In this case step 1508 stores an error status in the response block that will be sent back to CEC storage as part of communicating the operation completion to the OS COEX service executing on the central processors of the CEC. In the CFP, the module environment is cleared in step 1509 in preparation to perform a next request. It is a requirement that successive invocations of a functional COEX be independent and not reveal information belonging to one user of the COEX to another user of it. The control program then signals the CCP that it has terminated the operation in step 1510. The CFP then waits in step 1511 for a next operation signal from the CCP. If no error is found in step 1501, control passes from step 1502 to step 1503, which sends the request to the CCP, which performs CEC DAT and accesses CEC storage to fulfill the request (see FIGS. 16 and 17). After requesting the CCP to make the CEC storage access, the control program returns to the code module for its further processing in step 1504. Step 1505 is the entry point when the module has completed or terminated the requested operation and signals the control program on the CFP that the invoking program running on the central processors of the CEC can be notified of the completion. A normal-completion status indication is stored in the response block, and transfer is made to step 1509 where the module environment is cleared and then to step 1510 to signal the CCP that the module execution is complete. At step 1511 the control program waits for new signals.

Figure 16:
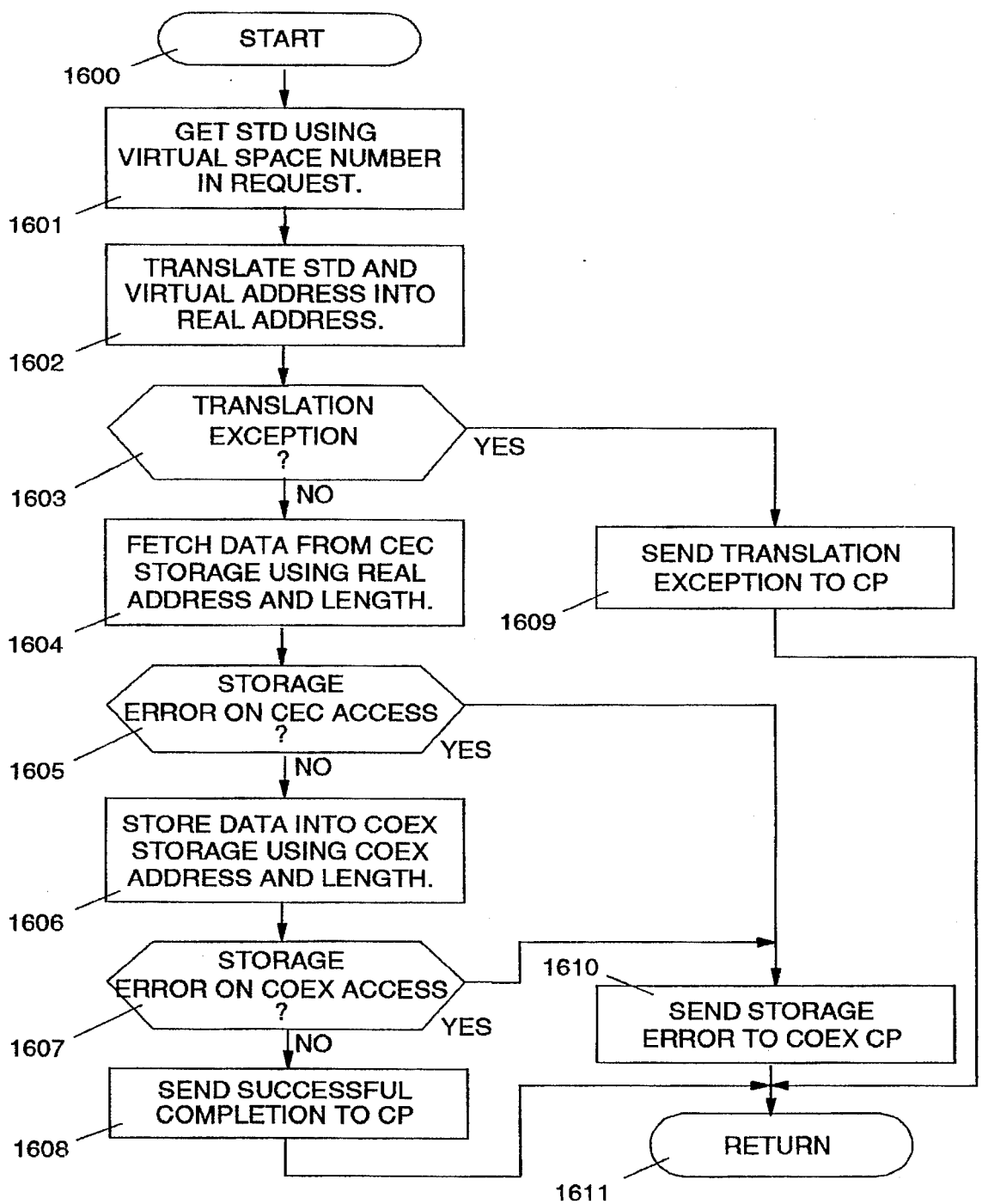
FIG. 16 is a flowchart of the GET request processing in the CCP which performs dynamic address translation and the storage accesses to the CEC and COEX storage, fetching data requested by the execution module from the CEC storage and placing it at the requested location in the COEX storage, returning any errors to the control program in the preferred embodiment.

FIG. 16 shows the processing in the CCP when it receives a GET request from the control program executing on the CFP. It uses the virtual space number to index into the table of STDs in the COB to find the STD of the space, in step 1601, and uses this, in this S/390 embodiment, to fetch, in step 1602, from CEC storage the segment and page tables required to translate the virtual CEC address to an absolute CEC storage address. It is apparent to one skilled in the art that many possible methods exist in the prior art by which the CCP could maintain a cache of frequently accessed segment and page tables in order to improve the performance of the CEC DAT in the COEX, so such caching will not be illustrated here. The Page Table Entry (PTE) is checked for validity at step 1603. If the virtual address is indicated as invalid in the PTE, a request-complete is signalled back to the control program on the CFP with an indication of translation exception. The same indication would result if there were errors in retrieving a segment or page table required for the DAT. This is done at step 1609, with step 1611 then returning to the CCP processing interrupted by the service-request signal. If the result of DAT is valid, step 1604 fetches the operand from CEC storage using the translated CEC absolute address and furnished length, and the CEC storage key from the COB header for CEC storage access in behalf of the module. If the data is received without a hardware error signal, tested for in step 1605, step 1606 stores the data into COEX storage at the location requested by the module in its request to the control program that resulted in this fetch. The control program in CFP is notified of successful completion of the GET request in step 1608 and control passes to step 1611 to return to the invoking routine (FIG. 12, step 1208). If the hardware signals any error in the CEC storage access, detected in step 1607, step 1610 signals the control program that the request is terminated with a hardware error report, and then control passes to step 1611 to return to the invoking routine (FIG. 12, step 1208).

Figure 17:
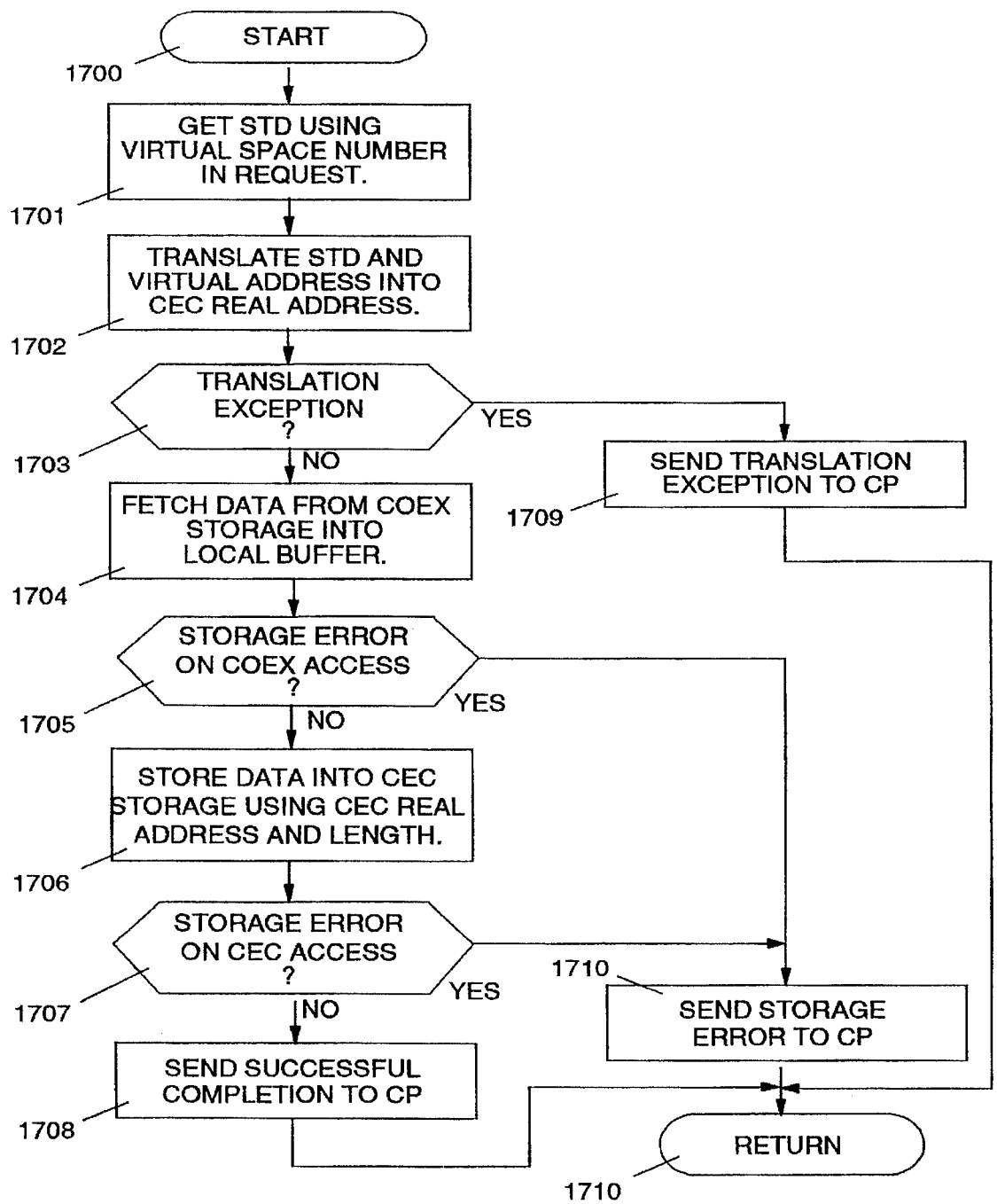
FIG. 17 is a flowchart of the PUT request processing in the CCP which performs dynamic address translation and the storage accesses to the COEX and CEC storage, fetching data as requested from the COEX storage and storing the same data into the CEC storage, returning any errors to the control program in the preferred embodiment.

FIG. 17 shows CCP processing on a request from the control program on the CFP for a PUT of data to the CEC storage. This processing is a parallel to FIG. 16. The STD number is obtained from the COB in step 1701, address translation is done in step 1702, and the PTE of the requested page is tested in step 1703. If invalid, 1704 sends the exception report back to the control program on CFP, and step 1710 returns to other CCP processing. If valid, step 1705 transfers the data into a data-transfer buffer and initiates the transfer to the absolute CEC address resulting from the address translation. This is done using the specified data length, and the CEC storage key for such accesses, obtained from the COB header. If a hardware error should result from the attempt to store the data in CEC storage, as checked for in step 1707, the control program is notified in step 1708, and control passes to step 1710 to return to the invoking routine (FIG. 12, step 1208). Otherwise, the control program is notified that the requested PUT request has been successfully completed in step 1709, and control passes to 1710 to return to the invoking routine (FIG. 12, step 1208).

Figure 18:
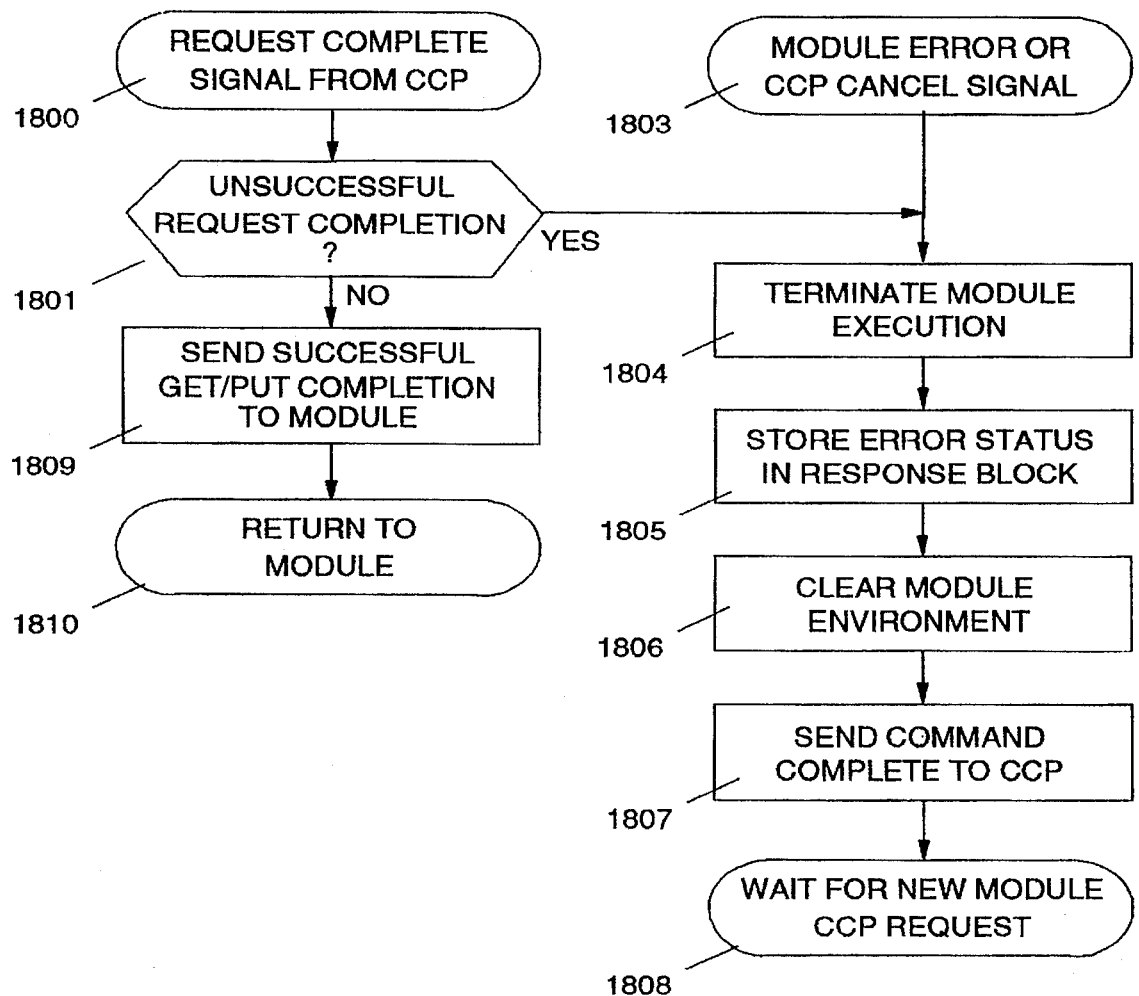
FIG. 18 is a flowchart of the control program processing which occurs on the CFP when a request complete signal is received from the CCP and for the module termination process that occurs when the execution module fails while active in the CFP in the preferred embodiment.

FIG. 18 shows the processing of the control program (control program) in the CFP on receiving a signal that a function request has been completed or terminated by the CCP, starting with entry at step 1800. If the request was successfully performed, tested for in step 1801, it was a GET or PUT request and an indication of the completion is made in COEX local storage to communicate this to the code module, in step 1809. Control is returned to the module, at step 1810, to the instruction at which it was interrupted by the receipt of the completion signal by the control program. If step 1801 detected an error return from the CCP, the module execution will be terminated at step 1804, an error indication is made in the COB response block at step 1805, the executing code module environment is cleared at step 1806 to prepare for a next operation request, and a command-complete signal is sent to the CCP at step 1807 so that it can notify the CEC OS of the completion. At step 1808, the control program awaits a next operation request signal from the CCP. Step 1803 is the entry point to the control program's functional module termination processing in the case of any code module error detected during its processing, e.g., a COEX-local addressing or storage error, or when the control program signals with a CANCEL signal that the current execution is to be terminated immediately. In this event, control is passed to step 1804 to start operation termination and CFP reset in preparation for the next operation.

Figure 19:
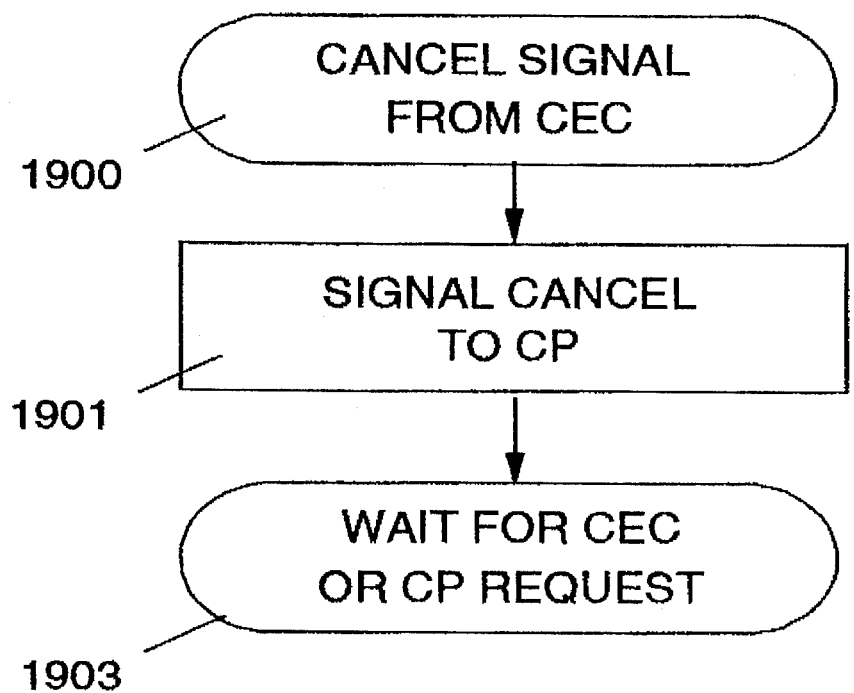
FIG. 19 is a flowchart of the CCP processing which occurs on the receipt of a CANCEL signal from the CEC to terminate the execution of a COEX functional module execution that is already in progress.

FIG. 19 shows the processing of a CANCEL signal from the CEC. This signal is used to terminate a COEX execution that is already in progress immediately, returning the COEX to the idle state and ready for further work. At step 1900, the CCP receives the CANCEL signal, which it then passes via a signal to the control program so that it can terminate the functional module (FIG. 18, step 1803). The CCP then waits for further signals from the CEC or control program in step 1903. Once the control program has terminate the code module processing and cleaned up the COEX environment, it will signal COMMAND COMPLETE to the CCP.

While the invention has been described in detail herein in accordance with certain preferred embodiments thereof, many modifications and changes therein may be effected by those skilled in the art. Accordingly, it is intended by the appended claims to cover all such modifications and changes as they fall within the true spirit and scope of the invention.

Having thus described our invention, what we claim as new and desire to secure by Letters Patent is:

1. A protective auxiliary storage interface for preventing access by an auxiliary processor (CFP) to a shared central electronic storage (CES) of a central electronic complex (CEC) having at least one central processor (CP) and a storage access control (SAC) for controlling accesses in the CES, the SAC receiving virtual storage requests from the CP, each virtual storage request having a virtual address associated with an address space designator for identifying one of plural virtual address spaces, the CEC having at least one operating system (OS), the OS having a translation table for each virtual address space accessible under the OS, the SAC using the translation tables to dynamically translate requested virtual addresses to associated real addresses in CES, the protective auxiliary storage interface comprising:

an isolation processor (CCP) connected between the CEC and the auxiliary processor (CFP), the CCP utilizing computer storage architecture of the CEC for accessing the CES, the CFP utilizing any computer architecture, the CEC not being required to execute CFP programs stored in CES, the CCP receiving all CEC commands requiring CFP operation, and the CCP utilizing CES authority controls for accessing CES to insulate and protect the CEC from operations by the CCP and CFP, non-OS authority controls of the CEC architecture being used by the CCP to access the CEC only within virtual address spaces designated by the CEC to the CCP, CFP programs being stored by the OS in the CES for offload processing which need not be executable by the CEC (such as when the CFP programs are in an architecture foreign to the CEC), the CFP programs being located in CES at a CES virtual address in a virtual address space (VAS) defined by a VAS designator, the CFP not being able to access CES, the OS executing in the CP to transfer the virtual address and the VAS designator to the CCP, the CCP storing the virtual address and VAS designator in storage accessible to the CCP, the CCP translating the virtual address by utilizing the VAS designator to generate a real address in the CES to access and transfer the CFP program, and data required by the CFP program, from the CES to CFP working storage (CWS), the CCP accessing the CES only at real storage areas assigned to the VAS designator currently accessible to the CCP to prevent the CCP from being able to access any data in the CES in unauthorized locations in CES, the CCP issuing commands to the CFP to execute the CFP programs in the CWS to perform work of any type capable of being offloaded to the CFP, and the CFP executing the CFP program with the data in the CWS to perform the offload work.

2. A protective auxiliary storage interface for preventing access by an auxiliary processor (CFP) to a shared central electronic storage (CES) of a central electronic complex (CEC), as defined in claim 1, further comprising:

the CFP executing the CFP program stored in CWS, the CFP signalling the CCP to obtain data from CES whenever the data required by the executing CFP program is not available in CWS, the CFP storing execution results in the CWS as determined by the CFP during and/or upon completion of the CFP program.

3. A protective auxiliary storage interface for preventing access by an auxiliary processor (CFP) to a shared central electronic storage (CES) of a central electronic complex (CEC), as defined in claim 1, further comprising:

the CFP execution of the CFP program generating and storing execution results in the CWS, and the CFP signalling the CCP when execution results are at least partially stored in CWS in a form transferrable to the CES, the CCP accessing in the CWS, and transferring to a designated location in CES, the CFP execution results whenever the CFP program indicates to CCP that the CFP execution results are partially or completely available in CWS, and the CCP signalling status information to the CEC when execution results for the offload work are available at the designated location in the CES.

4. A protective auxiliary storage interface for preventing access by an auxiliary processor (CFP) to a shared central electronic storage (CES) of a central electronic complex (CEC), as defined in claim 3, further comprising:

the designated location in CES being a virtual address in an address space designated to the isolation processor (CCP) by the CEC, and the CCP operating asynchronously with the CFP and the CEC by controlling transfers of CFP programs and data between the CES and the CWS, the transfers overlapping CFP execution of a program previously transferred to the CWS to increase efficiency of operations by the CCP, the CFP and the CEC.

5. A protective auxiliary storage interface for preventing access by an auxiliary processor (CFP) to a shared central electronic storage (CES) of a central electronic complex (CEC), as defined in claim 1, further comprising:

the CP being any of plural CPs in the CEC, and the CFP being any of plural CFPs in a coprocessing system managed by the CCP which isolates operations by the CFPs from the CEC, a plurality of CFP programs being stored in the CES for execution by the CFPs, and the CEC assigning a plurality of VAS designations to the CFP programs, a work queue for containing CFP work requests provided by the OS, each CFP work request having one or more VAS designations and a virtual address for a CFP program to be used for the request, invocation controls in the CCP operating on the work queue for accessing a queued CFP work request to control a transfer of a CFP program to the CWS for execution by any of the CFPs, and the invocation controls in the CCP signalling to the CFP when a CFP program has been stored in the CWS for execution by the CFP.

6. A protective auxiliary storage interface for preventing access by an auxiliary processor (CFP) to a shared central electronic storage (CES) of a central electronic complex (CEC), as defined in claim 5, further comprising:

termination controls in each CFP for signalling a completion of a CFP workload request and availability of CFP execution results in the CWS.

7. A protective auxiliary storage interface for preventing access by an auxiliary processor (CFP) to a shared central electronic storage (CES) of a central electronic complex (CEC), as defined in claim 6, further comprising:

invocation controls in the CCP actuating the CCP to access any next request on the queue in response to a termination signal from a CFP to cause a transfer of a next request for offload work to the CFP which sent the termination signal to initiate execution by the CFP of a next workload request, the execution operations by any CFP being performed asynchronously in relation to operations by the CCP and CEC.

8. A protective auxiliary storage interface for preventing access by an auxiliary processor (CFP) to a shared central electronic storage (CES) of a central electronic complex (CEC), as defined in claim 5, further comprising:

termination queue controls in the CCP receiving each completion signal from any CFP to communicate to the CEC an indication of completion of each CFP work request by the CFPs.

9. A protective auxiliary storage interface for preventing access by an auxiliary processor (CFP) to a shared central electronic storage (CES) of a central electronic complex (CEC), as defined in claim 8, further comprising:

termination signalling controls in the CCP initiated by each completion signal from any CFP to actuate the CCP to transfer to CES associated CFP execution results available in CWS and then signalling associated termination status information to the CEC.

10. A protective auxiliary storage interface for preventing access by an auxiliary processor (CFP) to a shared central electronic storage (CES) of a central electronic complex (CEC), as defined in claim 5, further comprising:

the CCP having signalling controls connected to a storage controller of the CES, each of the CFPs having signalling controls connected to the CCP, and the CCP managing all interface signalling operations of the CFPs including performing all signalling to the CES for the CFPs.

11. A protective auxiliary storage interface for preventing access by an auxiliary processor (CFP) to a shared central electronic storage (CES) of a central electronic complex (CEC), as defined in claim 1, further comprising:

an OS-to-CCP interface utilizing a start subchannel (SSCH) instruction in the OS for execution by any CP to communicate each CFP work request by any CP to the CCP, an operation request block (ORB) being an operand of the SSCH instruction located in the CES, the ORB containing a CEC virtual address and a CEC virtual address space designator for locating the CFP program in CES and being made available to the CCP to enable the CCP to transfer the CFP program from the CES to the CWS.

12. A protective auxiliary storage interface for preventing access by an auxiliary processor (CFP) to a shared central electronic storage (CES) of a central electronic complex (CEC), as defined in claim 11, further comprising:

each CFP program remaining in the CWS after completion of a CFP work request and continuing to be available for future CFP work requests until CWS space occupied by the CFP program is reclaimed to provide space for a next CFP program to be transferred by the CCP from the CES to the CWS.

* * * * *

UNITED STATES PATENT AND TRADEMARK OFFICE
CERTIFICATE OF CORRECTION

PATENT NO. : 5,655,146
DATED : August 5, 1997
INVENTOR(S) : Baum et al.

It is certified that error appears in the above-identified patent and that said Letters Patent are hereby corrected as shown below:

Column 11, line 42          "lib" should be --11B--

Signed and Sealed this

Thirtieth Day of December, 1997

Attest:

BRUCE LEHMAN

Attesting Officer                    Commissioner of Patents and Trademarks